US012089240B2

(12) United States Patent
Sevindik et al.

(10) Patent No.: US 12,089,240 B2
(45) Date of Patent: Sep. 10, 2024

(54) METHODS AND APPARATUS FOR ACCESS NODE SELECTION AND LINK OPTIMIZATION IN QUASI-LICENSED WIRELESS SYSTEMS

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/921,742

(22) Filed: Jul. 6, 2020

(65) Prior Publication Data
US 2022/0007374 A1 Jan. 6, 2022

(51) Int. Cl.
*H04W 72/54* (2023.01)
*H04B 17/318* (2015.01)
(Continued)

(52) U.S. Cl.
CPC ........ *H04W 72/542* (2023.01); *H04B 17/318* (2015.01); *H04B 17/3913* (2015.01);
(Continued)

(58) Field of Classification Search
CPC ............... H04W 72/085; H04W 16/14; H04W 16/22; H04W 16/28; H04W 24/02; H04W 48/16;
(Continued)

(56) References Cited

U.S. PATENT DOCUMENTS

| | | |
|---|---|---|
| 5,991,308 A | 11/1999 | Fuhrmann et al. |
| 5,995,499 A | 11/1999 | Hottinen et al. |

(Continued)

FOREIGN PATENT DOCUMENTS

| | | |
|---|---|---|
| CA | 2546598 C | 12/2011 |
| CA | 2643806 C | 6/2013 |

(Continued)

OTHER PUBLICATIONS

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

(Continued)

*Primary Examiner* — Steven Hieu D Nguyen
(74) *Attorney, Agent, or Firm* — Patent Beach PC

(57) ABSTRACT

Methods and apparatus for access node selection, and optimization of antenna direction and performance, within a power-limited system. In one embodiment, the system utilizes "quasi-licensed" CBRS (Citizens Broadband Radio Service) wireless spectrum in conjunction with a controller that dynamically adjusts antenna direction for receiving/transmitting information at an installed fixed wireless apparatus (FWA) at user or subscriber premises. In one variant, the FWA receives data on candidate access nodes (CBSDs), and includes controller logic that compares received power levels for candidate access nodes with the power levels estimated from path loss models, and optimizes antenna azimuth to maximize the antenna gain towards the selected access nodes. As such, service calls to optimize antenna performance after initial installation are not required, and network operating expenses are thereby reduced. Dynamic node reselection and optimization may also be used in (Continued)

instances of CBSD/spectrum withdrawal, changes in physical environment, and other applications.

23 Claims, 20 Drawing Sheets

(51) Int. Cl.
- *H04B 17/391* (2015.01)
- *H04W 16/14* (2009.01)
- *H04W 16/22* (2009.01)
- *H04W 16/28* (2009.01)
- *H04W 24/02* (2009.01)
- *H04W 48/16* (2009.01)
- *H04W 48/18* (2009.01)
- *H04W 72/542* (2023.01)

(52) U.S. Cl.
CPC ........... *H04W 16/14* (2013.01); *H04W 16/22* (2013.01); *H04W 16/28* (2013.01); *H04W 24/02* (2013.01); *H04W 48/16* (2013.01); *H04W 48/18* (2013.01)

(58) Field of Classification Search
CPC .... H04W 48/18; H04W 48/20; H04B 17/318; H04B 17/3913; H01Q 3/00
See application file for complete search history.

(56) References Cited

U.S. PATENT DOCUMENTS

| | | | |
|---|---|---|---|
| 6,154,648 A | 11/2000 | Comer | |
| 6,356,560 B1 | 3/2002 | Venters et al. | |
| 6,771,953 B1 | 8/2004 | Chow et al. | |
| 6,782,262 B1* | 8/2004 | Lundborg | H04W 36/04 |
| | | | 455/449 |
| 7,266,726 B1 | 9/2007 | Ladd et al. | |
| 7,592,912 B2 | 9/2009 | Hasek et al. | |
| 7,602,820 B2 | 10/2009 | Helms et al. | |
| 7,698,606 B2 | 4/2010 | Ladd et al. | |
| 8,024,607 B2 | 9/2011 | Ladd et al. | |
| 8,046,636 B2 | 10/2011 | Ladd et al. | |
| 8,095,610 B2 | 1/2012 | Gould et al. | |
| 8,170,065 B2 | 5/2012 | Hasek et al. | |
| 8,218,422 B2 | 7/2012 | Venturino et al. | |
| 8,302,111 B2 | 10/2012 | Ladd et al. | |
| 8,321,723 B2 | 11/2012 | Ladd et al. | |
| 8,718,100 B2 | 5/2014 | Markley et al. | |
| 8,799,723 B2 | 8/2014 | Ladd et al. | |
| 8,997,136 B2 | 3/2015 | Brooks et al. | |
| 9,185,341 B2 | 11/2015 | Hardin | |
| 9,213,538 B1 | 12/2015 | Ladd et al. | |
| 9,258,809 B2 | 2/2016 | Liao et al. | |
| 9,264,751 B2 | 2/2016 | Sarosi et al. | |
| 9,300,445 B2 | 3/2016 | Hardin | |
| 9,386,496 B2 | 7/2016 | Gupta et al. | |
| 9,414,111 B2 | 8/2016 | Hasek et al. | |
| 9,472,091 B2 | 10/2016 | Stern et al. | |
| 9,473,957 B2 | 10/2016 | Wellington | |
| 9,479,404 B2 | 10/2016 | Ladd et al. | |
| 9,526,056 B2 | 12/2016 | Tomici et al. | |
| 9,578,519 B2 | 2/2017 | Jaldén et al. | |
| 9,699,663 B1 | 7/2017 | Jovancevic | |
| 9,769,692 B2 | 9/2017 | Freda et al. | |
| 9,807,778 B2 | 10/2017 | Ma et al. | |
| 9,813,148 B2 | 11/2017 | Syed et al. | |
| 9,887,864 B1 | 2/2018 | Han et al. | |
| 10,098,568 B2 | 10/2018 | Gazdzinski | |
| 10,135,730 B2 | 11/2018 | Chou | |
| 10,164,858 B2 | 12/2018 | Gunasekara et al. | |
| 10,269,229 B2 | 4/2019 | Stern et al. | |
| 10,340,976 B2 | 7/2019 | Kakinada et al. | |
| 10,405,192 B2 | 9/2019 | Kakinada et al. | |
| 10,484,876 B2 | 11/2019 | Shah et al. | |
| 10,492,204 B2 | 11/2019 | Kakinada et al. | |
| 10,499,409 B2 | 12/2019 | Shattil | |
| 10,506,456 B2 | 12/2019 | Lou et al. | |
| 10,531,309 B1 | 1/2020 | Li et al. | |
| 10,536,859 B2 | 1/2020 | Gunasekara et al. | |
| 10,680,883 B2 | 6/2020 | Hall et al. | |
| 10,805,562 B2 | 10/2020 | Nakamura et al. | |
| 10,966,073 B2 | 3/2021 | Petersen | |
| 10,979,768 B2 | 4/2021 | Sarosi et al. | |
| 10,980,025 B2 | 4/2021 | Hmimy et al. | |
| 10,991,227 B2 | 4/2021 | Stern et al. | |
| 11,026,205 B2 | 6/2021 | Hmimy et al. | |
| 11,317,296 B2 | 4/2022 | Vaidya et al. | |
| 2002/0122040 A1 | 9/2002 | Noyle | |
| 2002/0126748 A1 | 9/2002 | Rafie | |
| 2003/0158906 A1 | 8/2003 | Hayes | |
| 2004/0001021 A1 | 1/2004 | Choo et al. | |
| 2004/0187150 A1 | 9/2004 | Gonder et al. | |
| 2004/0196834 A1* | 10/2004 | Ofek | H01Q 1/246 |
| | | | 370/352 |
| 2004/0230754 A1 | 11/2004 | Gumm et al. | |
| 2006/0188004 A1 | 8/2006 | Kizu et al. | |
| 2007/0022459 A1 | 1/2007 | Gaebel, Jr. et al. | |
| 2007/0094691 A1 | 4/2007 | Gazdzinski | |
| 2008/0010506 A1 | 1/2008 | Tabei et al. | |
| 2008/0097913 A1 | 4/2008 | Dicks et al. | |
| 2008/0126540 A1 | 5/2008 | Zeng et al. | |
| 2008/0220786 A1 | 9/2008 | Beacham | |
| 2008/0220788 A1 | 9/2008 | Stanwood et al. | |
| 2008/0235746 A1 | 9/2008 | Peters et al. | |
| 2009/0028182 A1 | 1/2009 | Brooks et al. | |
| 2009/0034443 A1 | 2/2009 | Walker et al. | |
| 2009/0129273 A1 | 5/2009 | Zou | |
| 2009/0253438 A1* | 10/2009 | Chater-Lea | H01Q 3/26 |
| | | | 455/562.1 |
| 2009/0323516 A1 | 12/2009 | Bhagwan et al. | |
| 2010/0094956 A1 | 4/2010 | Zuckerman et al. | |
| 2010/0128608 A1 | 5/2010 | Zou et al. | |
| 2010/0234042 A1 | 9/2010 | Chan et al. | |
| 2010/0262722 A1 | 10/2010 | Vauthier et al. | |
| 2010/0309806 A1 | 12/2010 | Wu et al. | |
| 2011/0014924 A1 | 1/2011 | Hwang et al. | |
| 2011/0292970 A1 | 12/2011 | Lansford et al. | |
| 2013/0007413 A1 | 1/2013 | Thomson et al. | |
| 2013/0039200 A1 | 2/2013 | Park et al. | |
| 2013/0122903 A1 | 5/2013 | Farnsworth et al. | |
| 2013/0182602 A1 | 7/2013 | Lee et al. | |
| 2013/0281092 A1 | 10/2013 | Gassend | |
| 2013/0288675 A1 | 10/2013 | Gassend | |
| 2013/0303145 A1* | 11/2013 | Harrang | H04W 24/10 |
| | | | 455/418 |
| 2013/0315124 A1 | 11/2013 | Rapaport et al. | |
| 2013/0336175 A1 | 12/2013 | Um et al. | |
| 2014/0035182 A1 | 2/2014 | Boyer et al. | |
| 2014/0106672 A1 | 4/2014 | Jeon et al. | |
| 2014/0194068 A1 | 7/2014 | Coppage et al. | |
| 2014/0215457 A1 | 7/2014 | Gava et al. | |
| 2014/0241187 A1 | 8/2014 | Barkay et al. | |
| 2014/0269526 A1 | 9/2014 | Mitola, III | |
| 2014/0308986 A1 | 10/2014 | Yang et al. | |
| 2015/0055623 A1 | 2/2015 | Li et al. | |
| 2015/0058861 A1 | 2/2015 | Zheng et al. | |
| 2015/0071239 A1 | 3/2015 | Zhang et al. | |
| 2015/0133173 A1* | 5/2015 | Edge | G01S 5/08 |
| | | | 455/456.6 |
| 2015/0156095 A1 | 6/2015 | Lu | |
| 2015/0208262 A1 | 7/2015 | Siomina | |
| 2015/0280847 A1 | 10/2015 | Somasundaram et al. | |
| 2015/0304856 A1 | 10/2015 | Garcia et al. | |
| 2015/0334664 A1 | 11/2015 | Sawai et al. | |
| 2015/0341753 A1* | 11/2015 | Chen | H04B 17/318 |
| | | | 455/456.1 |
| 2016/0007147 A1 | 1/2016 | Zhang et al. | |
| 2016/0073259 A1 | 3/2016 | Lee et al. | |
| 2016/0128001 A1 | 5/2016 | Tsuda | |
| 2016/0165066 A1 | 6/2016 | Yang et al. | |
| 2016/0182134 A1 | 6/2016 | Kol et al. | |
| 2016/0212031 A1 | 7/2016 | Jain et al. | |
| 2016/0234746 A1 | 8/2016 | Gopal et al. | |

(56) References Cited

U.S. PATENT DOCUMENTS

| | | |
|---|---|---|
| 2016/0330743 A1 | 11/2016 | Das et al. |
| 2016/0381600 A1 | 12/2016 | Aksu |
| 2017/0013422 A1 | 1/2017 | Saiwai et al. |
| 2017/0026203 A1 | 1/2017 | Thomas et al. |
| 2017/0104644 A1 | 4/2017 | Ladd et al. |
| 2017/0155703 A1 | 6/2017 | Hao et al. |
| 2017/0164326 A1 | 6/2017 | Worrall |
| 2017/0188241 A1 | 6/2017 | Mueck et al. |
| 2017/0208540 A1 | 7/2017 | Egner et al. |
| 2017/0257750 A1 | 9/2017 | Gunasekara et al. |
| 2017/0272955 A1 | 9/2017 | Sadek |
| 2017/0295497 A1* | 10/2017 | MacMullan .......... H04W 24/02 |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple |
| 2017/0318472 A1 | 11/2017 | Yu et al. |
| 2017/0359731 A1 | 12/2017 | Soldati et al. |
| 2018/0007587 A1 | 1/2018 | Feldman et al. |
| 2018/0049036 A1 | 2/2018 | Sethi et al. |
| 2018/0063736 A1 | 3/2018 | Sadeghi et al. |
| 2018/0063758 A1 | 3/2018 | Velu |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda |
| 2018/0352386 A1 | 12/2018 | Gunasekara et al. |
| 2019/0021012 A1 | 1/2019 | Beck et al. |
| 2019/0028182 A1* | 1/2019 | Smyth .................. H04W 24/08 |
| 2019/0037480 A1* | 1/2019 | Sun ...................... H04W 64/00 |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0150182 A1 | 5/2019 | Koorapaty et al. |
| 2019/0182895 A1 | 6/2019 | Di Girolamo et al. |
| 2019/0222266 A1 | 7/2019 | Cui et al. |
| 2019/0230613 A1 | 7/2019 | Kim et al. |
| 2019/0239190 A1 | 8/2019 | Patel et al. |
| 2019/0254094 A1 | 8/2019 | Babu et al. |
| 2019/0289470 A1 | 9/2019 | Vaidya et al. |
| 2019/0296789 A1* | 9/2019 | Yu ......................... H04B 1/401 |
| 2019/0319814 A1 | 10/2019 | Das |
| 2019/0319858 A1 | 10/2019 | Das et al. |
| 2019/0320250 A1 | 10/2019 | Hoole et al. |
| 2019/0320322 A1 | 10/2019 | Jayawardene et al. |
| 2019/0320490 A1 | 10/2019 | Liu et al. |
| 2019/0320494 A1 | 10/2019 | Jayawardene et al. |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0393926 A1 | 12/2019 | Kakinada et al. |
| 2019/0394790 A1 | 12/2019 | Damnjanovic et al. |
| 2020/0014693 A1 | 1/2020 | Frederick et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0083892 A1 | 3/2020 | Kundu et al. |
| 2020/0084759 A1 | 3/2020 | Liu et al. |
| 2020/0146058 A1 | 5/2020 | Xu et al. |
| 2020/0178237 A1 | 6/2020 | Kakinada et al. |
| 2020/0187150 A1 | 6/2020 | Eisner |
| 2020/0221392 A1 | 7/2020 | Xue et al. |
| 2020/0228993 A1 | 7/2020 | Gunasekara |
| 2020/0252933 A1 | 8/2020 | Hmimy et al. |
| 2020/0275457 A1 | 8/2020 | Hmimy |
| 2020/0344515 A1 | 10/2020 | Wong et al. |
| 2020/0412565 A1 | 12/2020 | Sanders |
| 2021/0014693 A1 | 1/2021 | Syed et al. |
| 2021/0026711 A1 | 1/2021 | Ovadia et al. |
| 2021/0037444 A1 | 2/2021 | Harel |
| 2021/0051653 A1 | 2/2021 | Park et al. |
| 2021/0076424 A1 | 3/2021 | Mukherjee et al. |
| 2021/0084117 A1 | 3/2021 | Ovadia et al. |
| 2021/0105633 A1 | 4/2021 | Vaidya et al. |
| 2021/0120315 A1 | 4/2021 | Makinen et al. |
| 2021/0126662 A1 | 4/2021 | Solichien |
| 2021/0127423 A1 | 4/2021 | Park et al. |
| 2021/0136838 A1 | 5/2021 | Khalid et al. |
| 2021/0204322 A1 | 7/2021 | Lou et al. |
| 2021/0219143 A1 | 7/2021 | Khalid et al. |
| 2021/0219303 A1 | 7/2021 | Khalid et al. |
| 2021/0227396 A1 | 7/2021 | Khalid et al. |
| 2021/0235495 A1 | 7/2021 | Xu et al. |
| 2021/0258868 A1 | 8/2021 | Wong et al. |
| 2021/0266914 A1 | 8/2021 | Yoo et al. |
| 2021/0274333 A1 | 9/2021 | Petersen |
| 2021/0274499 A1 | 9/2021 | Hmimy et al. |
| 2021/0274506 A1 | 9/2021 | Raghavan et al. |
| 2021/0297979 A1 | 9/2021 | Hmimy et al. |
| 2021/0328664 A1* | 10/2021 | Schwab ................. H04B 7/026 |
| 2021/0376905 A1 | 12/2021 | Zhou et al. |
| 2022/0007200 A1 | 1/2022 | Sevindik |
| 2022/0078804 A1 | 3/2022 | Hmimy |
| 2022/0167176 A1 | 5/2022 | Khalid |
| 2022/0183093 A1 | 6/2022 | Sevindik et al. |
| 2022/0191675 A1 | 6/2022 | Mukherjee |

FOREIGN PATENT DOCUMENTS

| | | |
|---|---|---|
| CA | 3097140 A1 | 10/2019 |
| CA | 3154554 A1 | 3/2021 |
| CN | 111989900 A | 11/2020 |
| EP | 1769634 A2 | 4/2007 |
| EP | 2294860 A1 | 3/2011 |
| EP | 2294860 | 4/2017 |
| EP | 3741168 A1 | 11/2020 |
| EP | 3782341 A1 | 2/2021 |
| EP | 3797546 A1 | 3/2021 |
| GB | 2585394 A | 1/2021 |
| JP | 2021510973 A | 4/2021 |
| WO | WO-2005052766 A2 | 6/2005 |
| WO | WO-2013020599 A1 | 2/2013 |
| WO | WO-2017130494 A1 | 8/2017 |
| WO | WO-2017186294 A1 | 11/2017 |
| WO | WO-2019140461 A1 | 7/2019 |
| WO | WO-2019204165 A1 | 10/2019 |
| WO | WO-2019226838 A1 | 11/2019 |
| WO | WO-2020160403 A1 | 8/2020 |
| WO | WO-2021050957 A1 | 3/2021 |
| WO | WO-2021067810 A1 | 4/2021 |
| WO | WO-2021086986 A1 | 5/2021 |

OTHER PUBLICATIONS

Souryal, Michael R., et al., "Effect of Federal Incumbent Activity or on CBRS Commercial Service", International Symposium on Dynamic Spectrum Access Networks (DySPAN), IEEE 2019, 5 pages.

Deering, S., et al., "Internet Protocol, Version 6 (IPv6) Specification", Internet Engineering Task Force (IETF) RFC 2460, Dec. 1998, 39 pages.

"Internet Protocol, DARPA Internet Program, Protocol Specification", IETF RCF 791, Sep. 1981, 50 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

3GPP, "Technical Specification—3rd Generation Partnership Project, Technical Specification Group Services and System Aspects,

(56) References Cited

OTHER PUBLICATIONS

Telecommunication Management, Charging management, Proximity-based services (ProSe) charging (Release 14)," TS 32.277, V14.0.0, Sep. 2016, 91 pages.
3GPP TR 36.746 V15.0.0 (Sep. 2017), "3rd Generation Partnership Project; Technical Specification Group Radio Access Network; Study on Further Enhancements to LTE Device to Device (D2D), User Equipment (UE) to Network Relays for Internet of Things (IoT) and Wearables; (Release 15)", 56 pages.
3GPP., TS 23.303 V12.0.0 (Feb. 2014), "3rd Generation Partnership Project; Technical Specification Group Services and System Aspects; Proximity-based Services (ProSe), Stage 2 (Release 12)", 53 pages.
3GPP TS 23.501 v.15.4.0 (Dec. 2018) 3rd Generation Partnership Project; Technical Specification Group Services and System Aspects; System Architecture for the 5G System; Stage 2; Release 15, 236 pages.
3GPP TS 38.473 V15.A.A (Apr. 2018) 3rd Generation Partnership Project; Technical Specification Group Radio Access Network; NG-RAN; F1 application protocol (F1AP) (Release 15), 106 pages.
3GPP TS 38.889 3rd Generation Partnership Project; Technical Specification Group Radio Access Network; Study on NR-based Access to Unlicensed Spectrum; Release 16, (Nov. 2018), 120 pages.
3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.
Article 5 of the Radio Regulations (edition 2001), Introduction to International Radio Regulations, 161 pages.
IEEE 802.11 standard, 1997, URL: http://www.ieeexplore.ieee.org/documenU654779, 459 pages.
IEEE Std. 802.11 or related standards including 802.11a/b/g/n/s/v/ac/ad/ax/ay/ba/be or 802.11-2012/2013, 802.11-2016.
Nokia 5G New Radio (NR): Physical Layer Overview and Performance, IEEE Communication Theory Workshop, 2018 by A. Ghosh, May 15, 2018, 38 pages.
Wi-Fi Direct, "Wi-Fi Peer-to-Peer (P2P) Specification," Wi-Fi Alliance, Version 1.5, 2014, 183 pages.
Kulacz, Lukasz, et al.; "Coordinated Spectrum Allocation and Coexistence Management in CBRS-SAS Wireless Networks"; IEEE Access 7; 2019; 139294-139316.

\* cited by examiner

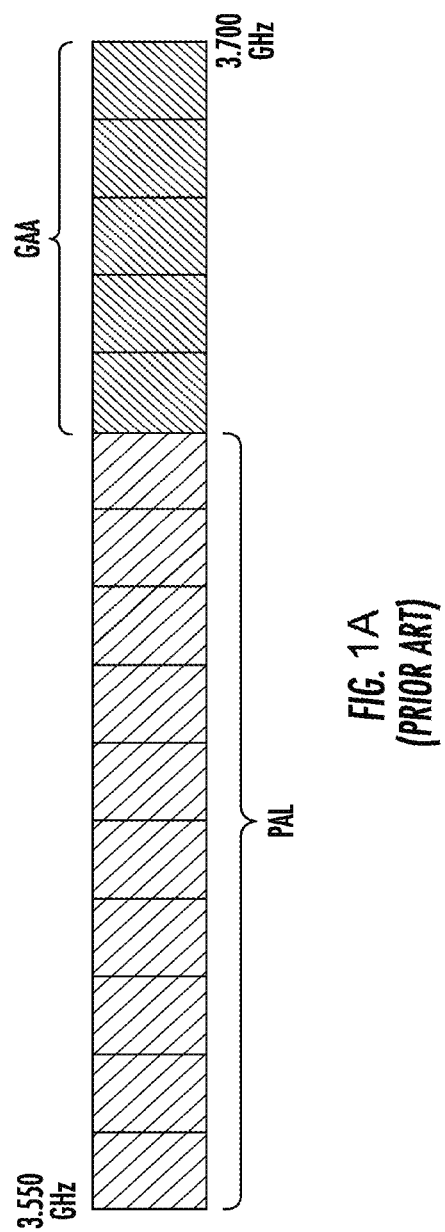

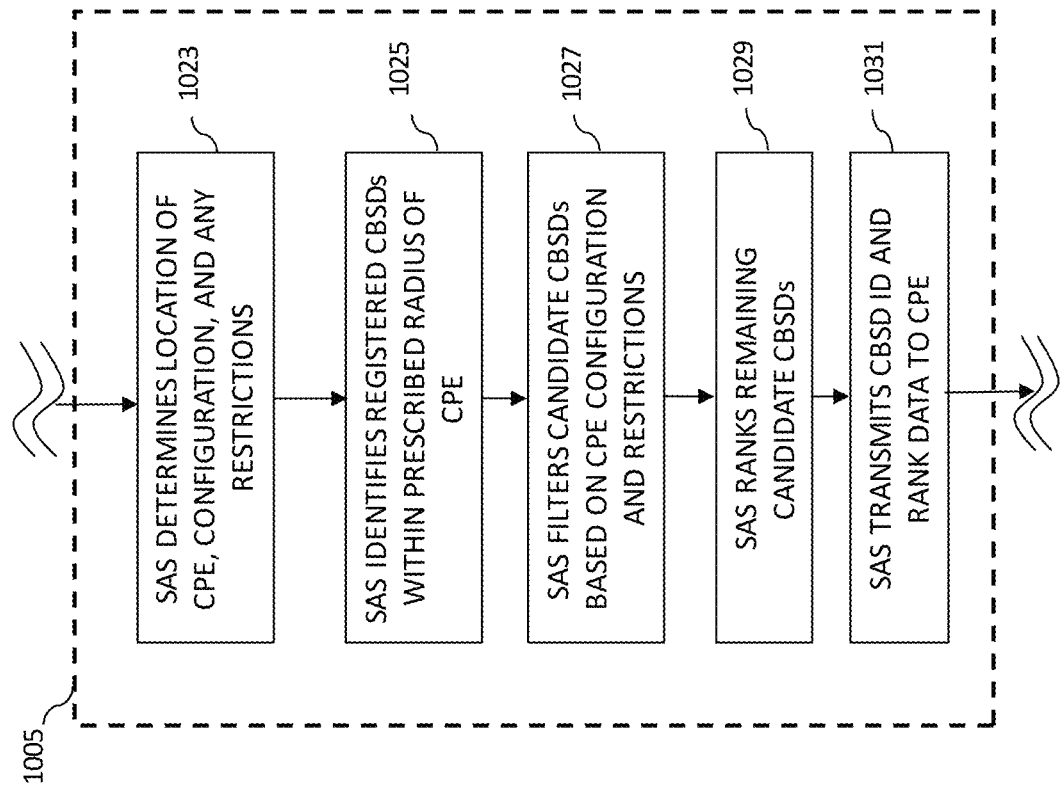

METHODS AND APPARATUS FOR ACCESS NODE SELECTION AND LINK OPTIMIZATION IN QUASI-LICENSED WIRELESS SYSTEMS

RELATED APPLICATIONS

The subject matter of this application is generally related to subject matter of co-owned and co-pending U.S. patent application Ser. No. 16/676,188 filed Nov. 6, 2019 entitled "METHODS AND APPARATUS FOR ENHANCING COVERAGE IN QUASI-LICENSED WIRELESS SYSTEMS," and issued as U.S. Pat. No. 11,457,485 on Sep. 27, 2022; Ser. No. 16/738,889 filed Jan. 9, 2020 entitled "METHODS AND APPARATUS FOR SERVICE PROVISION TO OUT-OF-COVERAGE APPARATUS IN WIRELESS SYSTEMS," and issued as U.S. Pat. No. 11,368,853 on Jun. 21, 2022; Ser. No. 16/741,509 filed Jan. 13, 2020 and entitled "METHODS AND APPARATUS FOR RADIO CONFIGURATION IN A WIRELESS SYSTEM," and issued as U.S. Pat. No. 11,729,806 on Aug. 15, 2023; and Ser. No. 16/749,539 filed Jan. 22, 2020 entitled "METHODS AND APPARATUS FOR ANTENNA OPTIMIZATION IN A QUASI-LICENSED WIRELESS SYSTEM," and issued as U.S. Pat. No. 11,363,466 on Jun. 14, 2022, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1 Technological Field

The present disclosure relates generally to the field of wireless networks and specifically, in one or more exemplary embodiments, to methods and apparatus for selection of access nodes and optimization of antenna performance for premises devices, such as those providing connectivity via quasi-licensed Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently, only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |

TABLE 2-continued

| Frequency range | Type | Center frequency | Availability | Licensed users |
|---|---|---|---|---|
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands have also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2.

Incumbent Access (existing DoD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 1A.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined as any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of CPE and Base Station Optimization—

With increasing demand for coverage by broadband networking services, such as those delivered via use of CBRS spectrum, there is an increasing amount of wireless equipment that is being deployed for servicing such demand. One way in which broadband wireless services are provided, including at cell edges or areas with poor coverage (e.g., in rural areas), is by use of Fixed Wireless Access (FWA) Devices.

Under a typical prior art scheme, the serving network, via the transmitting base station 206 (e.g. CBSD/xNB) controls the recipient or served CPE/FWA 300 (see FIG. 3), and hence is responsible for directing the device 300 with respect to which CBSD/xNB to connect with for provision of service. As shown in FIG. 3, the CPE/FWA 300 may lie within coverage areas of different CBSDs 206 simultaneously. In the illustrated case, the CPE/FWA 300 receives the signal 322 from the designated CBSD/xNB 206*b* to which it is connected, and effectively treats the other signals 324 and 326 from other CBSD/xNB 206*a*, 206*c* as interference. Obviously, as more CPE/FWA 300 and base stations 206 are placed within a given geographic area, the amount of interference experienced by a given CPE/FWA will increase, and as such the need for better signal strength values between the CPE/FWA and its serving CBSD/xNB will also increase.

Moreover, with greater infrastructure deployment such as the FWA device of FIG. 3, service providers are faced with a growing level of difficulty not only in finding an optimal orientation and placement of the CPE based on factors that are apparent during installation (e.g., some knowledge of a location of a particular CBSD/xNB in relation to the client equipment), but also in finding an optimal orientation that is not readily apparent to a service personnel performing the installation of the client equipment (e.g., based on an actual level of service that is available between the client equipment and any CBSD/xNB). In some installation cases, the installer may not know the exact (or even general) azimuth of a nearby CBSD relative to the CPE being installed, and may not be aware that the CPE falls within multiple CBSD coverage areas as in FIG. 3.

Furthermore, network, environmental, and operational conditions surrounding a given Consumer Premises Equipment (CPE) installation may frequently change for various reasons, such as removal of existing base stations 206*a* or addition of new base stations 206*c* (as shown in FIG. 4) or addition of new CPE nearby (each of which can adversely affect interference experienced by the given CPE installation), and changes in RF signal propagation and losses due to e.g., addition or movement of structures such as buildings, cellular infrastructure, billboards, etc. These changes in the environment of the deployed CPE have traditionally necessitated "truck rolls" for equipment adjustment, tuning, re-installation, update, and/or troubleshooting. Notably, a CPE installed at a first time may be optimally adjusted at installation, but due to e.g., subsequent installations of other CPE nearby and interference or other effects caused thereby, may rapidly become "non-optimized." The installer/service provider cannot necessarily foresee what effects subsequent installations of other CPE may have (and in fact may not know where/when such installations may occur), and hence is often forced into necessarily reactive solutions for a constantly changing problem, such as manual adjustments via service personnel, which when considered on a large scale (such as in higher customer density regions) becomes untenable.

As more equipment is deployed, additional resources must be spent to address and respond to such changes, especially those which negatively impact the user's "experience." Long-term customer loyalty may also be adversely affected; even if such servicing or "truck rolls" are highly effective at mitigating or remedying the issues which crop up, they none-the-less devalue the service providers quality in the eyes of their customers, since unnecessary time, effort, and frustration are expended by the customers through the issue discovery/contact/resolution cycle necessitated by such scenarios.

Notably, extant CBRS architectures currently lack mechanisms for CBSD selection and antenna optimization at a given CPE/FWA. In particular, CPEs typically include a high gain omni-directional or directional antenna mounted usually on the rooftop of a premises or venue, which in the case of a directional antenna may be pointing to the direction of a base station (e.g., CBSD/xNB antenna). At the time of installation, the CPE antenna is generally placed as optimally as possible on the roof top or a premises façade to maximize the received Signal-to-Noise Ratio ("SNR"), and minimize interference. For example, for an omni-directional antenna, the antenna may be mounted sufficiently high on the roof or façade such that interference within an LOS (line of sight) between the antenna and a known base station is minimized. Similarly, for a directional antenna element, the main lobe of the antenna may be pointed (as close as reasonably possible) in a direction where Signal-to-Interference-plus-Noise Ratio ("SINR") or similar is maximized (which may or may not be a direct LOS between the antenna element and the target base station). In either case, once the CPE is installed, it is rarely moved (intentionally), and in fact such subsequent movements due to e.g., loss of signal strength/quality or throughput are very costly to the service provider (e.g., "truck rolls" or other labor-intensive solutions must be utilized).

Additionally, non-optimal levels of networking service are often observed at cell edges or area with less network coverage (such as in rural areas), which similarly require truck rolls and associated cost/latency. For example, conventional directional or omni-directional CPE antennas at a cell edge will not, e.g., in poor RF conditions, be able to meet the prevailing SLA (service level agreement) requirements on a continuous basis. In some such cases, a given CPE's performance may vary (including to levels below SLA) as a function of RF conditions—which may be highly unpredictable and/or change with time—thereby further adding to customer frustration.

One feasible work-around would be to utilize a directional antenna with wider beam width or dispersion of the RF signal, either on the transmitter side and/or the receiver side, so as to in effect focus and capture more relevant RF energy and compensate for any antenna misalignment or other confounding artifacts. However, use of wider beam-width (including in the limiting case omni-directional propagation) may also cause further interference with other CPEs and base stations, especially in more densely packed use cases such as urban areas.

In high density environments, the CPE may also experience significant interference from the other users operating in the same frequency band or an adjacent band. Hence, the CPE may feasibly try to increase its EIRP in order to compensate for the interference, as well as path losses. However, with use of a quasi-licensed wireless system such as CBRS and the like, the CPE is capped at a comparatively low power level (e.g., EIRP no greater than 23 dBm for e.g., CBRS as discussed previously), and hence "more signal" on the CPE side is not a viable answer. Likewise, higher power by the CBSD may create additional interference for other CPE, as discussed previously with respect to FIG. 3A.

In addition to the foregoing, selection of an optimal base station (from multiple possible candidates) for use by any given CPE requires careful consideration, not only to optimize the signal quality to/from that CPE, but also to minimize (where possible) interference or other impacts on other equipment such as other CBSDs or CPE, all of the foregoing which also may change with time after installation of the CPE. As shown in FIG. 4, a given CPE may have several possible choices for a serving CBSD at any point in time, and it may not be clearly evident to service personnel at time of installation, or thereafter, which is then then-current optimal CBSD to utilize.

Better Solutions Needed—

Based on the foregoing, there is a need for improved methods and apparatus enabling both (i) selection of an optimal base station or access node (e.g., CBSD) for a given CPE at time of that CPE's installation (or thereafter), and (ii) dynamic antenna optimization for the CPE in order to compensate for non-optimal network or RF conditions, antenna misalignment, high levels of RF interference, or other such conditions which might otherwise necessitate service provider intervention.

Ideally, these improved methods and apparatus would, inter alia, enable network service providers and operators to provide both efficient access node selection (or re-selection), and dynamic adjustment of the antenna direction and orientation in a time-sensitive fashion and with greater efficiency, and reduce the amount of resources required to maintain and/or achieve a desired level of service to the user/subscriber.

SUMMARY

The present disclosure addresses the foregoing needs by providing, inter alia, methods and apparatus for providing enhanced access node selection, characterization and optimization of premises devices within a wireless network.

In a first aspect of the disclosure, a method for operating a fixed wireless device within a wireless network is described. In one embodiment, the method includes: obtaining channel propagation model data from the wireless network, the channel propagation model data relating to at least one wireless channel between the fixed wireless device and at least one base station; computing an expected received signal strength; measuring actual signal strength at the fixed wireless device for the at least one wireless channel; and utilizing at least the expected signal strength and the measured signal strength to optimize a configuration of at least one antenna of the fixed wireless device.

In one variant, the channel propagation model data relates to at least one wireless channel between the fixed wireless device and at least two base stations, and the method further includes: computing an expected received signal strength for each of the at least two base stations; measuring actual signal strength at the fixed wireless device wireless channel from each of he at least two base stations; utilizing at least the expected signal strength and the actual signal strength associated with each of the at least tow base stations to determine a respective difference value for each of the at least two base stations; and selecting one of the at least two base stations as a basis for the optimization.

In another variant, the fixed wireless device includes a CBRS (Citizens Broadband Radio Service) compliant FWA device, and the at least one base station includes at least one Citizens Broadband Radio Service Device (CBSD), and the obtaining the propagation model data includes obtaining model data relating to a frequency band between 3.550 and 3.700 Ghz. Obtaining channel propagation model data from the wireless network may include e.g., obtaining channel propagation model data from a SAS (spectrum allocation system) of the CBRS network.

In another variant, the utilizing at least the expected signal strength and the measured signal strength to optimize a configuration of at least one antenna of the fixed wireless device includes determining whether to invoke an antenna azimuth adjustment process based on a difference between the expected signal strength and measured signal strength. In one implementation thereof, the method further includes invoking the antenna azimuth adjustment process when the difference between the expected signal strength and measured signal strength exceeds a prescribed value, the measured signal strength being less than the expected signal strength.

In yet another variant, the method further includes obtaining sector-specific data from the at least one base station; and at least the computing an expected received signal strength, and the measuring the actual signal strength at the fixed wireless device, comprise computing and measuring on a per-sector basis, respectively, based on the obtained sector-specific data. In one implementation thereof, the obtaining sector-specific data from the at least one base station includes obtaining at least a PCI (physical cell identifier) and transmit power for each of a plurality of sectors of the at least one base station.

In another aspect of the disclosure, a computerized premises apparatus for use in a wireless infrastructure is described. In one embodiment, the computerized premises apparatus includes: digital processing apparatus; an antenna system comprising at least one antenna element and at least one actuation apparatus configured to change at least one aspect of operation of the at least one antenna element; radio modem apparatus in signal communication with the antenna system; controller apparatus in data communication with the antenna system and the digital processing apparatus and configured to control the actuation apparatus; and a storage device in data communication with the digital processing apparatus, the storage device comprising a storage medium having at least one computer program. In one variant, the at least one computer program is configured to, when executed on the digital processing apparatus, cause the computerized premises apparatus to: determine an actual signal strength based at least on radio frequency signals received by the antenna system, the radio frequency signals received from a base station; determine an expected signal strength associated with the base station based at least on a channel propagation model; compute a difference between the actual signal strength data and the expected signal strength data; and based at least on the difference, utilize the controller to implement a protocol using the actuation apparatus, the protocol comprising a plurality of adjustments of a position of the at least one antenna element in order to provide a desired level of performance for at least one communication channel between the computerized premises apparatus and the base station.

In one implementation, the at least one computer program is further configured to, when executed on the digital processing apparatus, cause the computerized premises apparatus to: determine a second actual signal strength based at least on radio frequency signals received by the antenna system, the radio frequency signals received from a second base station; determine an expected signal strength associated with the second base station based at least on a channel propagation model; compute a second difference between the second actual signal strength and the expected signal strength for the second base station; and based at least in part on the difference and the second difference, select one of the base station and second base station as a basis for the utilization of the controller. In one configuration, the computerized premises apparatus includes a CBRS (Citizens Broadband Radio Service) compliant FWA (fixed wireless access) device, and the base station and second base station each comprise a Citizens Broadband Radio Service Device (CBSD); and wherein the channel propagation model data includes model data relating to a frequency band between 3.550 and 3.700 Ghz.

In another configuration, the at least one computer program is further configured to, when executed on the digital processing apparatus, cause the computerized premises apparatus to: obtain data relating to a distance between the computerized premises apparatus and each of the base station and the second base station; and utilize the obtained data as part of each of (i) the determination of an expected signal strength associated with the base station, and (ii) the determination of an expected signal strength associated with the second base station.

In a further configuration, the at least one computer program is further configured to, when executed on the digital processing apparatus, cause the computerized premises apparatus to: obtain data identifying the base station and the second base station; and based at least on the obtained data, cause performance of the determinations of the actual signal strength and the second actual signal strength, the determinations of the expected signal strength and the second expected signal strength, and the computations of the difference and the second difference. For instance, in one configuration, the at least one computer program is further configured to, when executed on the digital processing apparatus, cause the computerized premises apparatus to utilize the obtained data to select the performance of the determinations of the actual signal strength and the second actual signal strength, the determinations of the expected signal strength and the second expected signal strength, and the computations of the difference and the second difference, in a prescribed order, the prescribed order based at least in part on a distance between the computerized premises apparatus and each of the base station and second base station.

In another variant, the at least one computer program is further configured to, when executed on the digital processing apparatus, cause the computerized premises apparatus to: obtain sector-specific data from the base station, the sector-specific data comprising at least a PCI (physical cell identifier) and transmit power for each of a plurality of sectors of the base station. At least the determination of the expected signal strength, and the determination of the actual signal strength, comprise computation and measurement on a per-sector basis, respectively, based on the obtained sector-specific data.

In another aspect of the disclosure, a computerized network apparatus for use in a wireless infrastructure is described. In one embodiment, the computerized network apparatus includes: digital processing apparatus; a first network interface for communication with a first data network, the first network interface in data communication with the processor; a second network interface for communication with a data storage apparatus, the second network interface in data communication with the processor; and a storage device in data communication with the digital processing apparatus, the storage device comprising a storage medium having at least one computer program.

In one variant, the at least one computer program configured to, when executed on the digital processing apparatus, cause the computerized network apparatus to: receive data relating to a fixed wireless apparatus (FWA) within the wireless infrastructure; based at least on the received data, identify at least one wireless access node within the wireless infrastructure which meets at least one prescribed criterion relating to the FWA; generate at least one message to the FWA, the at least one message including data relating to the identified at least one wireless access node; and cause transmission of the at least one message to the FWA.

In one implementation, the at least one computer program is further configured to, when executed on the digital processing apparatus, cause the computerized network apparatus to: select at least one propagation model for use by the FWA in evaluation of the at least one base station; and include data relating to the selected at least one propagation model within the at least one message. In one configuration thereof, the data relating to the selected at least one propagation model includes a plurality of parameters selected by the computerized network apparatus for use with the at least one propagation model.

In another implementation, the wireless infrastructure includes a wireless network utilizing 3GPP (Third Generation Partnership Project) 4G (fourth Generation) Long Term Evolution or 5G (Fifth Generation) New Radio compliant infrastructure utilizing Citizens Broadband Radio Service (CBRS) spectrum within the frequency range of 3.55 to 3.70 GHz, and the computerized network apparatus includes a CBRS SAS (spectrum allocation system).

In yet another implementation, the wireless infrastructure includes a wireless network utilizing 3GPP (Third Generation Partnership Project) 4G (fourth Generation) Long Term Evolution or 5G (Fifth Generation) New Radio compliant infrastructure utilizing Citizens Broadband Radio Service (CBRS) spectrum within the frequency range of 3.55 to 3.70 GHz, and the computerized network apparatus includes a computerized process operated by a multiple systems operator (MSO) of a managed content deliver network; and the FWA, the database, and the at least one base station are each managed by the MSO.

Additionally, methods and apparatus for comparing the difference between the expected performance data and the actual performance data against a prescribed threshold are disclosed.

In a further aspect, a method for antenna optimization of a client device (e.g., CPE/FWA) is disclosed. In one embodiment, the CPE/FWA having its antenna optimized is configured to utilize CBRS quasi-licensed spectrum, the method includes measuring one or more RF propagation or channel parameters between the CPE/FWA and at least one base station, and storing the measured data in a database.

In one variant, the method uses the measured data to optimize the antenna system performance in real time or near-real time.

In another variant, the method utilizes previously measured data from the data base relating to one CPE/FWA to optimize antenna performance for at least one other CPE/FWA.

In another embodiment, the method includes using a control loop to optimize antenna azimuth and tilt/elevation. In one implementation, the method reports the measured data to a SAS, and receives feedback data from the network SAS.

In one embodiment of the method, the measured data includes received SINR. In one implementation, the method includes using a computer program to measures the SINR once the CPE/FWA has achieved an RRC_Connected state with a serving base station.

In a further aspect of the disclosure, a closed-loop (aka "feedback") control system for use on a CPE/FWA apparatus is disclosed. In one embodiment, the system includes a local controller and feedback logic coupled to the controller, the logic configured to generate data relating to SINR or antenna gain for use by the controller in updating or adjusting the subsequent position or operation of the CPE/FWA.

In another aspect of the disclosure, a network architecture for delivery of wireless data to at least one fixed wireless receiver apparatus (e.g., CBRS FWA) is disclosed. In one embodiment, the network architecture includes: a plurality of wireless base stations; a computerized network device in data communication with the plurality of base stations; at least one fixed wireless transceiver apparatus; at least one antenna element installed on the fixed wireless transceiver; a computerized premises device in data communication with the at least one fixed wireless transceiver; and a controller apparatus in data communication with the computerized network device. In one variant, the fixed wireless transceiver apparatus includes a plurality of electrical actuators which are logically communicative with the controller apparatus (e.g., logic) executing on the fixed transceiver, the actuators and logic configured to optimize antenna azimuth and elevation of the at least one antenna element at or after installation.

In one variant, the architecture uses a frequency range between 3.550 and 3.70 GHz inclusive, and the plurality of wireless base stations comprise CBRS (Citizens Broadband Radio Service) compliant CBSDs (Citizens Broadband radio Service Devices) utilizing 3GPP LTE or 5G NR radio technology, and which are managed by a common service provider such as an MSO.

In an additional aspect of the disclosure, computer readable apparatus is described. In one embodiment, the apparatus includes a storage medium configured to store one or more computer programs, such as a control system logic module of the above-mentioned FWA. In one embodiment, the apparatus includes a program memory or HDD or SDD, and is part of a CPE/FWA device and its local controller.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In a further aspect, an integrated circuit controller apparatus for use in a CPE is disclosed. In one embodiment, the IC apparatus includes configurable logic blocks for implementing radio, performance monitoring, and antenna array control functions for the CPE, based on output from local logic and/or the above-referenced network controller process.

In yet another aspect, a method for optimizing an antenna configuration of a fixed wireless device operated in a wireless network, is disclosed. In one embodiment, the method includes: obtaining channel performance data, the channel performance data relating to at least one wireless channel between the fixed wireless device and at least one base station; and utilizing at least a portion of the obtained data to optimize at least one antenna configuration of the fixed wireless device.

In another aspect, methods and apparatus for storing one or more path loss models applicable to a geographic location are disclosed.

In a further aspect, methods and apparatus for selecting a path loss model for a geographic location or a particular FWA device are disclosed.

In another aspect, methods and apparatus for calculating a physical distance between a client device (e.g., CPE/FWA) and a CBSD are disclosed.

In yet another aspect. methods and apparatus for selecting a CBSD to service a client device (e.g., CPE/FWA) are disclosed.

In another aspect, methods and apparatus for calculating expected performance data between a client device (e.g., CPE/FWA) and a CBSD, based on a path loss model are disclosed.

In a further aspect, methods and apparatus for measuring actual performance data between a client device (e.g., CPE/FWA) and a CBSD are disclosed.

In a further aspect, methods and apparatus for dynamically updating path loss or propagation models are disclosed.

These and other aspects shall become apparent when considered in light of the disclosure provided herein.

BRIEF DESCRIPTION OF THE DRAWINGS

FIG. 1A is a graphical representation of allocations for PAL versus GAA users within a frequency band.

FIG. 11 is a logical flow diagram of one implementation of the method of FIG. 10, specifically relating to CBSD evaluation and selection by e.g., a SAS.

Figure 1:
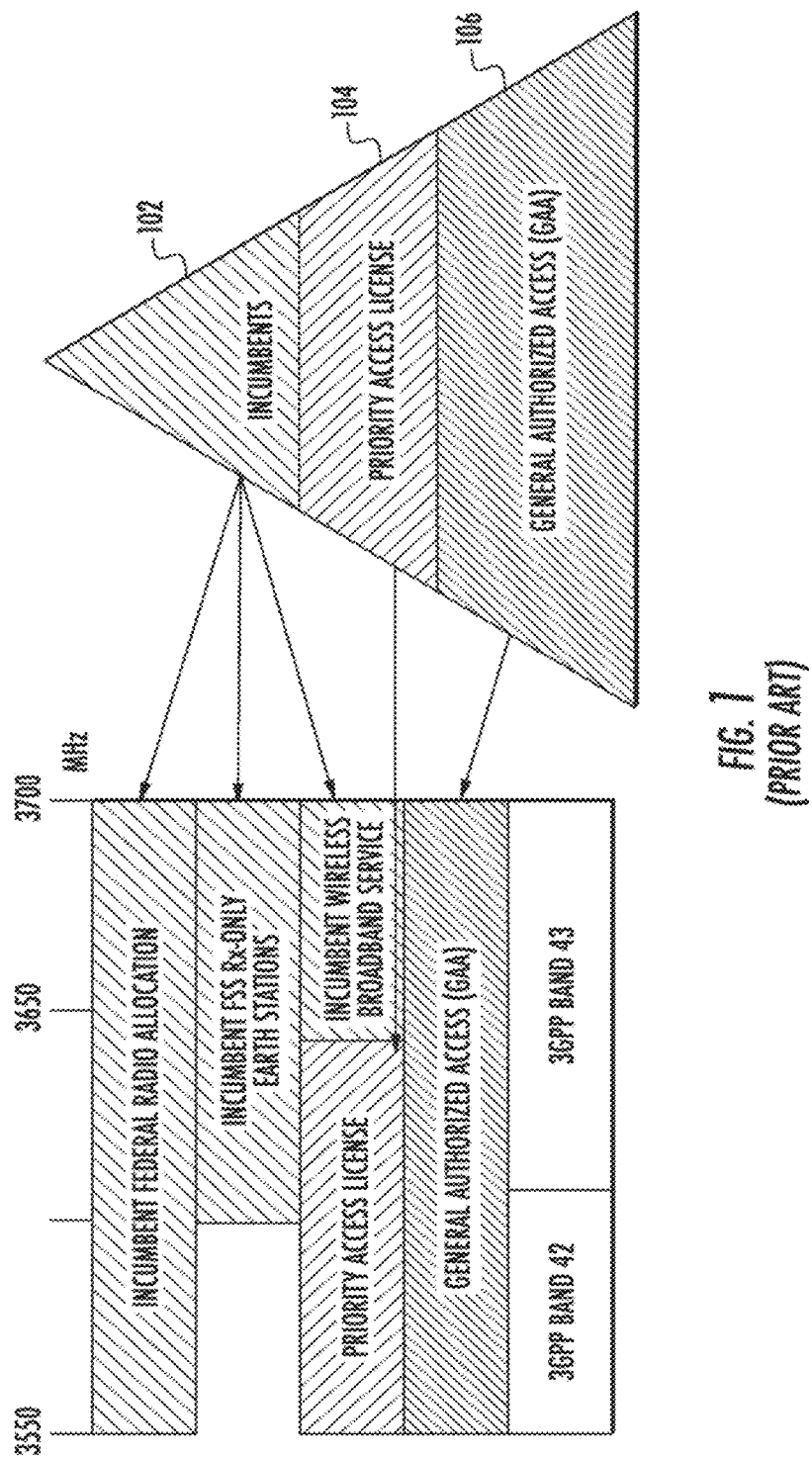
FIG. 1 is a graphical illustration of prior art CBRS (Citizens Broadband Radio Service) users and their relationship to allocated frequency spectrum in the 3.550 to 3.700 GHz band.
Figure 2:
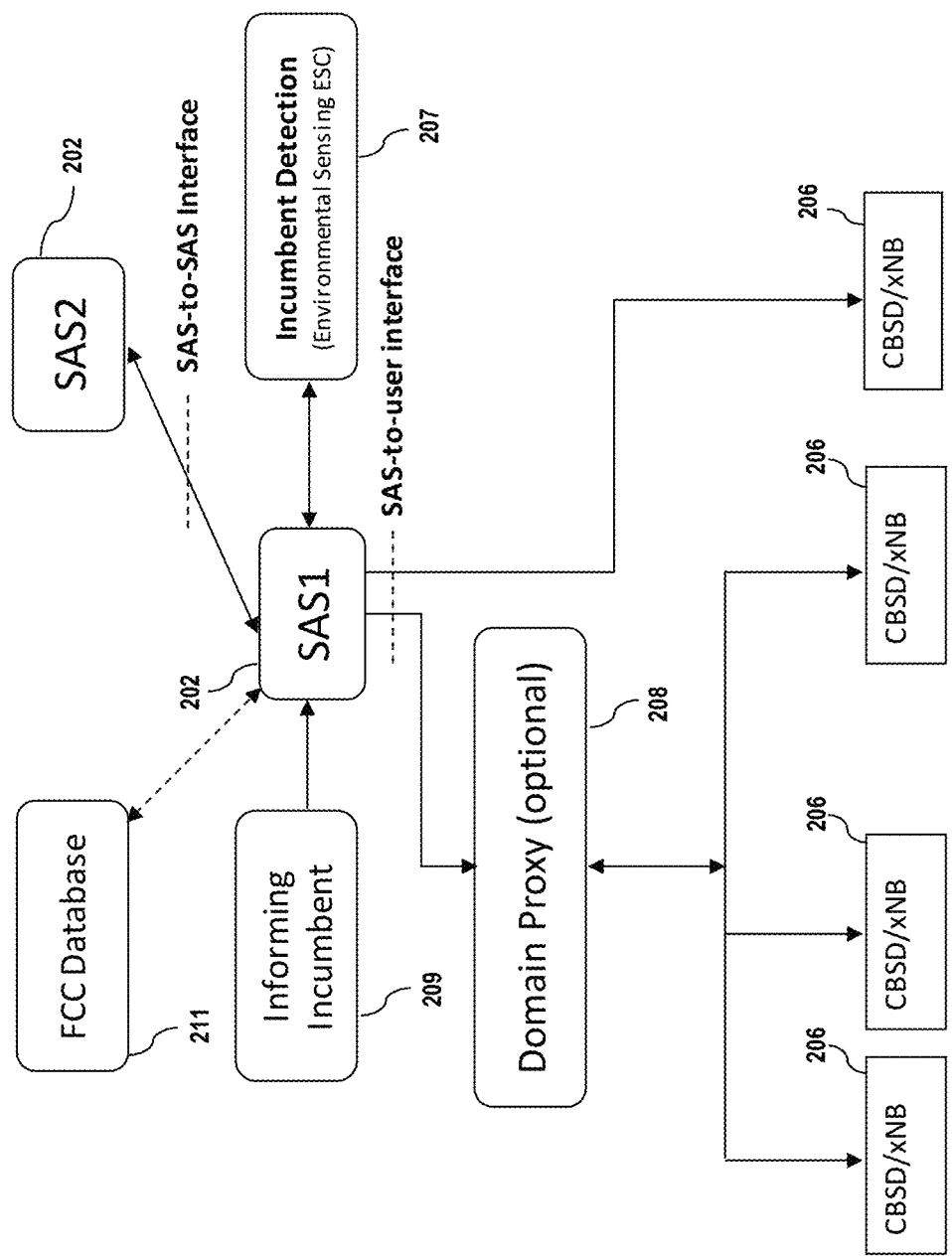
FIG. 2 is a block diagram illustrating a general architecture for the CBRS system of the prior art.
Figure 3:
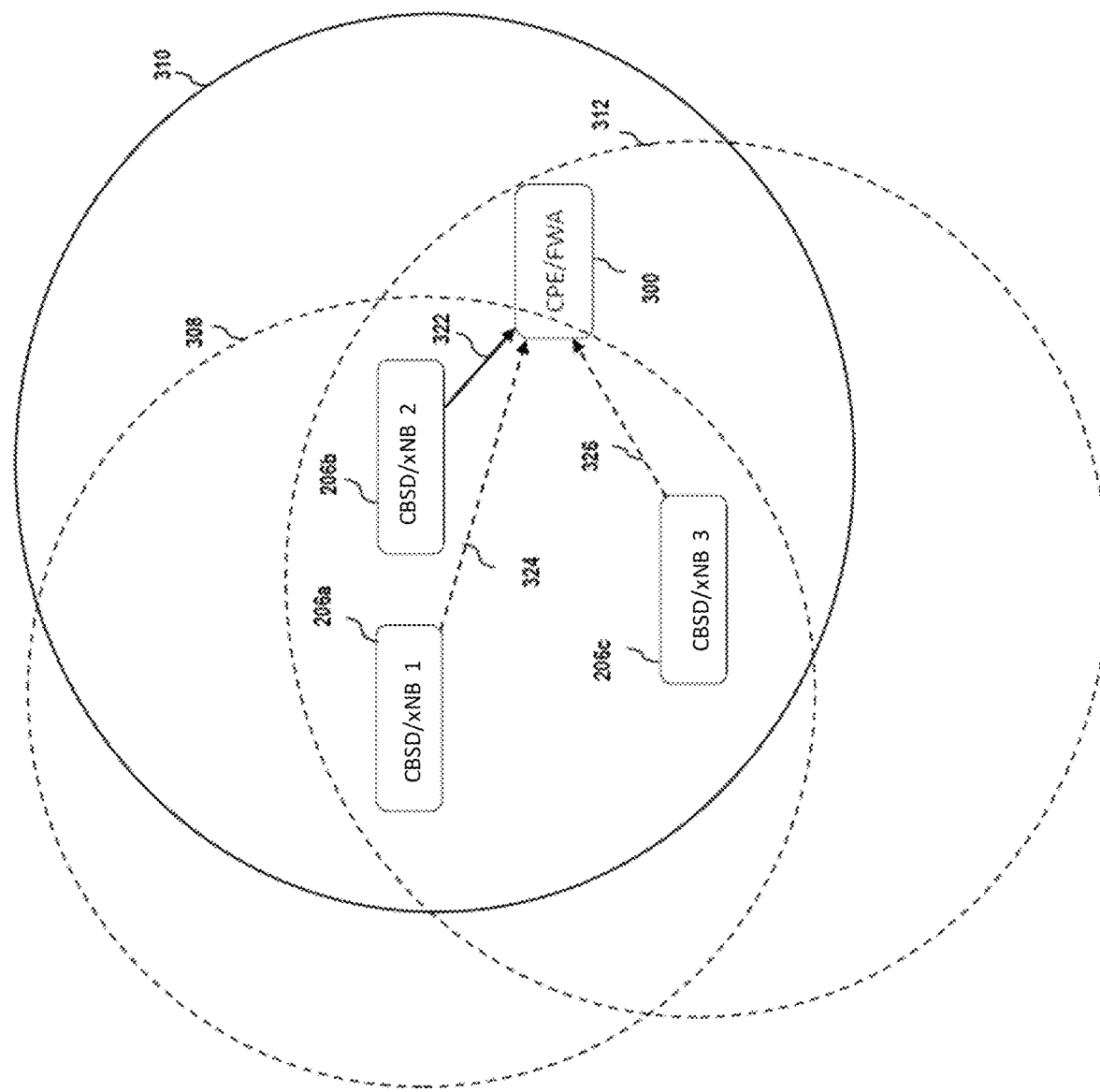
FIG. 3 illustrates a prior art CPE/FWA operating within range of three different base stations.
Figure 4:
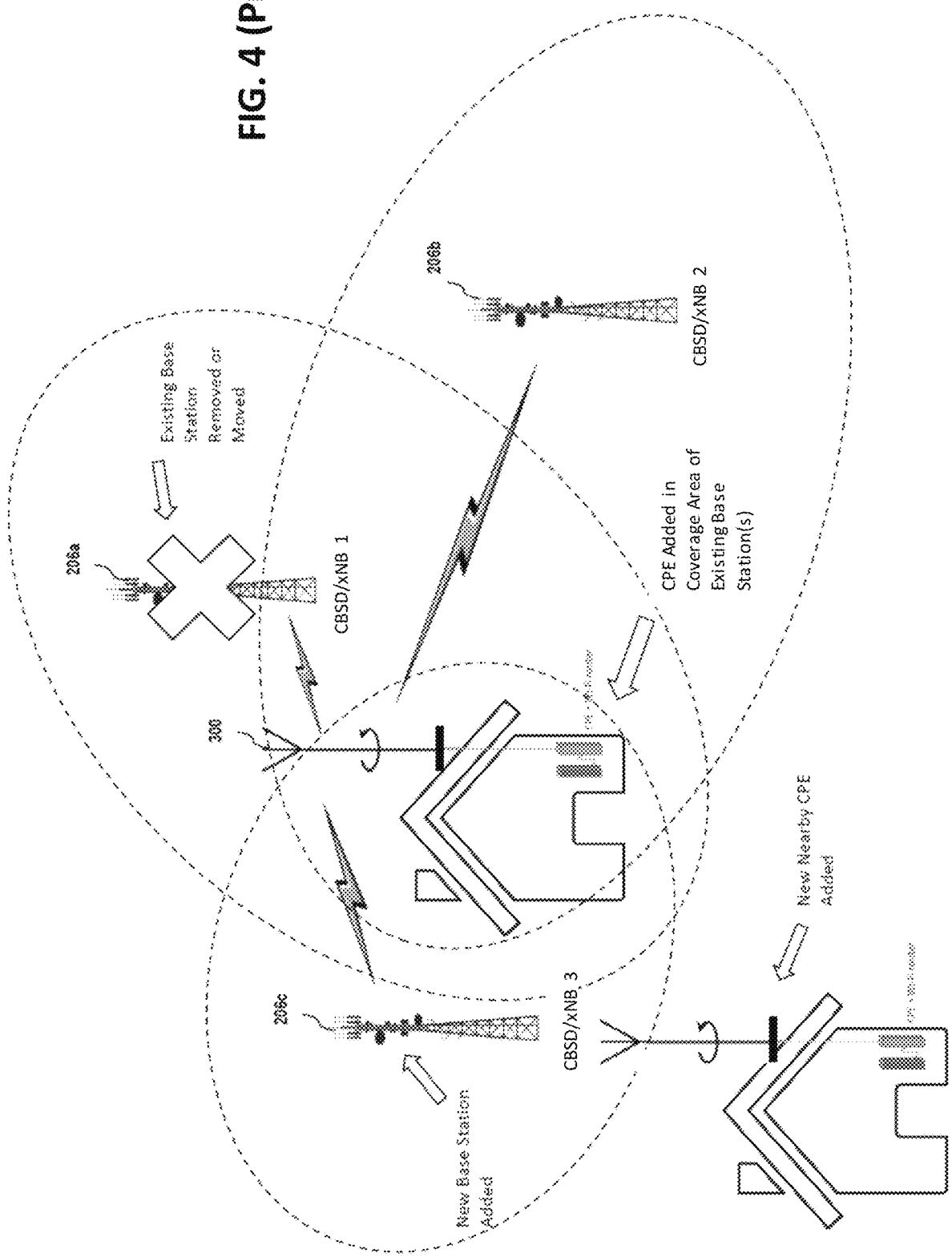
FIG. 4 is a graphical illustration of a prior art wireless network, showing various changes or conditions that may occur such as addition of a new base station, movement or removal of an existing base station, or placement of CPE/FWA apparatus for a premises at the edge of a coverage area or cell of the wireless network.

All figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, or a cellular xNB.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)-Citizens Broadband Radio Service Device (CBSD) Interface Technical Specification*—Document WINNF-TS-0016, Version V1.2.1. 3 Jan. 2018, incorporated herein by reference in its entirety, and any related documents or subsequent versions thereof.

As used herein, the terms "client device" or "user device" or "UE" include, but are not limited to, set-top boxes (e.g., DSTBs), gateways, FWA devices/CPE, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, ruby, Python, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, HBM/HBM2, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, 16 and/or 17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ax/ay/ba or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eUTRAN) and gNBs (5G NR).

Overview

In one salient aspect, the present disclosure describes methods and apparatus for (i) selection of one or more optimal base stations for use by a given CPE or FWA device within a power-limited wireless system, and (ii) optimizing antenna direction and configuration for that selected CPE/FWA so that maximum throughput and optimized end-to-end performance is achieved without requiring an increase in transmission power for either the CPE/FWA or the serving base station (which may be unavailable or otherwise cause undue interference).

Advantageously, such methods and apparatus may be utilized in a variety of installation types and operational scenarios, including after initial installation. Applications include high population density areas (e.g., urban, downtown applications), where proper antenna direction is critical due to signal density, high levels of interference, and/or obstructions within the signal propagation environment (e.g., buildings, transient objects such as trucks, etc.), as well as rural areas where, due to reduced CBSD density and significant distances between CBSD and CPE, overgrown foliage, and natural topographical features, proper CBSD selection and antenna alignment can be critical.

In one embodiment, the methods and apparatus utilize so-called "quasi-licensed" CBRS (Citizens Broadband Radio Service) wireless spectrum in conjunction with a controller architecture within an installed fixed wireless apparatus (FWA) that dynamically optimizes the antenna direction towards the best available CBSD to receive the maximum Signal-to-Interference-Plus-Noise (SINR) for optimum delivery of services to user or subscriber premises.

In one configuration, the CPE/FWA is provided with data (such as from a SAS or even MSO core network function) regarding potential or candidate CBSDs, and includes indigenous control logic that obtains signal and performance data via its antenna elements and radio head, and uses the data to adjust the antenna elements so as to optimize performance of the CPE/FWA once a candidate is selected based on the received data. Extant performance or signal quality measurements resident within the underlying wireless protocols (e.g., SRS and CRS or CQI data associated with 3GPP channel quality estimates) may also be leveraged for characterizing the wireless environment, and as inputs to the CPE/FWA optimization process.

The CPE/FWA may also receive (from the SASe or an MSO proxy thereof) wireless environment characterization data such as one or more path loss models which can be used by the CPE to estimate the signal power it should receive from a given CBSD. This estimate can be used by the CPE/FWA to perform CBSD selection and/or antenna optimization.

As such, CPE/FWA antennas system optimization as described herein provides the capability for enhancing the performance and data rates at consumer premises, including in post-installation scenarios where base station inventory changes, more local CPE are added, and/or RF propagation paths change due to e.g., natural or man-made effects. This capability also advantageously obviates maintenance calls or "truck rolls" and other network operating expenses, and enhances customer satisfaction through reduced-latency correction of performance issues, and accelerated new service velocity.

The methods and apparatus described herein can also advantageously be extended to other shared-access architectures (i.e., other than CBRS) such as for example DSA, LSA, and TVWS systems, as well as those utilizing (fully) licensed and/or unlicensed RF spectrum.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client or FWA devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed area, venue or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi-licensed" or shared access systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Moreover, while described in the context of quasi-licensed or unlicensed spectrum, it will be appreciated by those of ordinary skill given the present disclosure that various of the methods and apparatus described herein may find application within a licensed spectrum context.

Further, while some aspects of the present disclosure are described in detail with respect to so-called "4G/4.5G" 3GPP Standards (aka LTE/LTE-A) and so-called 5G "New Radio" (3GPP Release 15/16/17 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

CPE/FWA and System Architecture—

Figure 5:
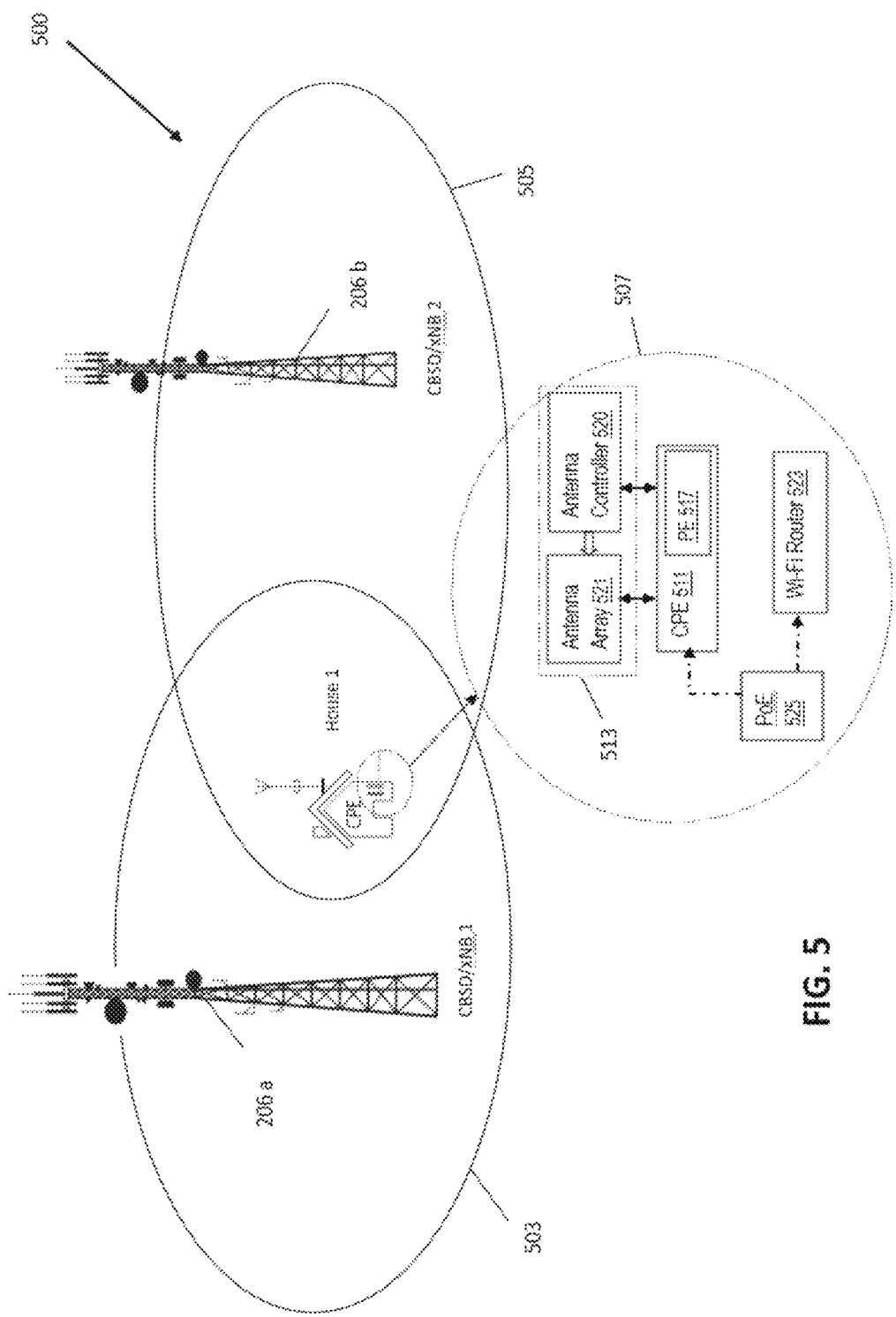
FIG. 5 is a block diagram illustrating one embodiment of an enhanced CPE configuration according to the present disclosure.

FIG. 5 illustrates an exemplary CPE/FWA antenna optimization architecture according to the present disclosure.

As illustrated, the architecture 500 includes an inventive CPE/FWA 507 (described in greater detail below) disposed at/on a premises, such as a customer house or building. The CPE/FWA 507 is potentially served in this example by two base stations (xNB 1206a and xNB 2 206b) having respective coverage areas 503, 505, within which the instant CPE/FWA 507 lies, although it will be appreciated that other numbers and/or types of base stations may be used to service the CPE/FWA 507.

The illustrated CPE/FWA 507 includes a indoor CPE device 511 (e.g., a gateway, DSTB, modem, or other such form factor of computerized premises device) including power estimator (PE) logic 517, Wi-Fi or other routers 523, PoE apparatus 525, and an outdoor CPE device 513 including one or more antenna elements 521, and an antenna controller 520.

As discussed in greater detail below, in the exemplary embodiment, the power estimator 517 at each inventive CPE/FWA 507 is used to estimate a power or signal level based on one or more selected path loss models, so as to facilitate CBSD selection and antenna element tuning.

Use of power estimation based on selecting path loss models (whether by the SAS, an MSO core process, or locally at the CPE), and dynamically updating the model parameters at the CPE/FWA device 507, advantageously allows for a very low-overhead and efficient mechanism by which to optimized the antenna direction so as to maximize the received SINR.

Figure 6:
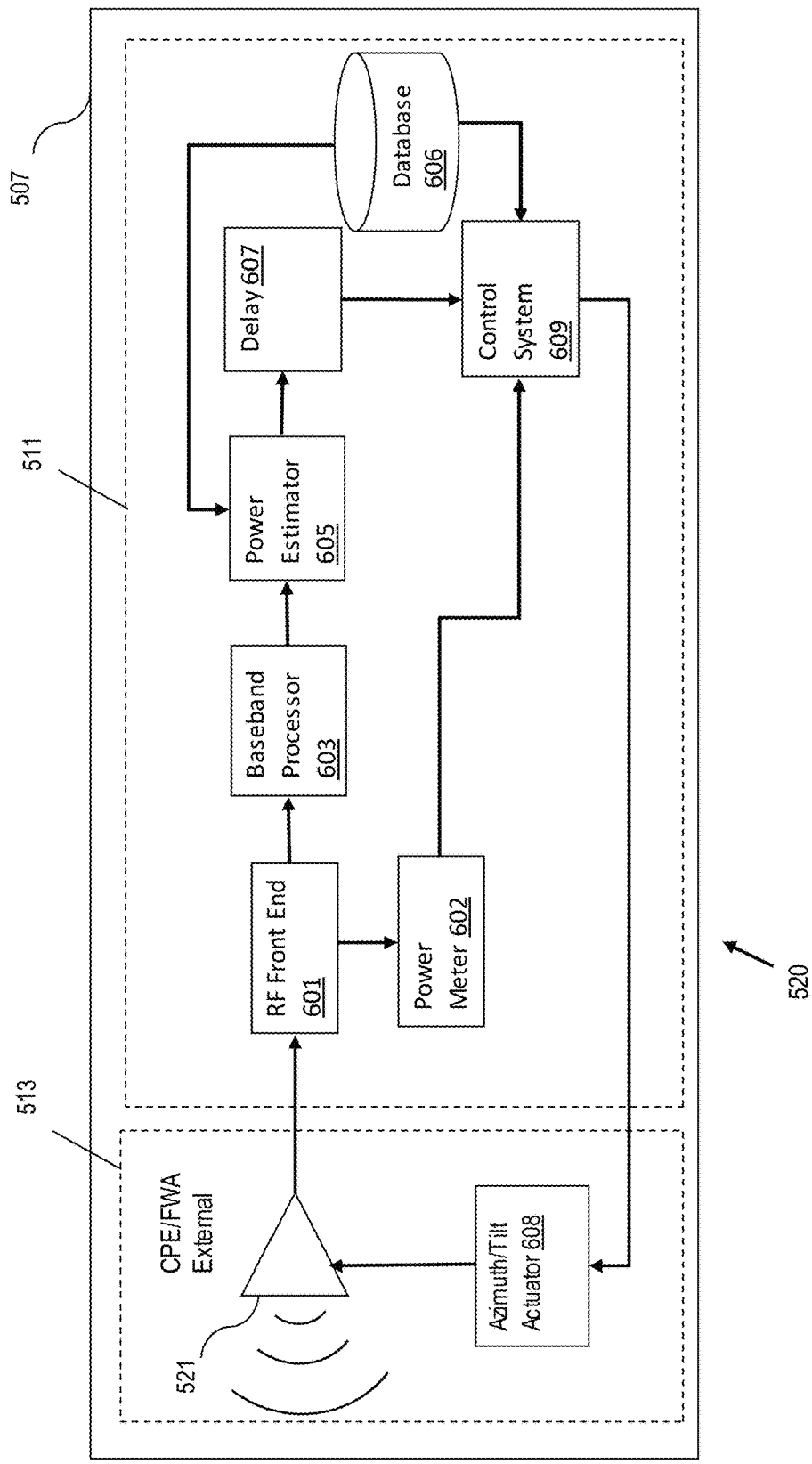
FIG. 6 is a logical block diagram of one exemplary embodiment of CPE antenna controller according to the present disclosure, illustrating the operation thereof.

FIG. 6 is a logical block diagram of one exemplary embodiment of antenna controller apparatus 520 of FIG. 5, illustrating the operation thereof. In this example, the controller logic is part of the CPE/FWA 507 (distributed across the indoor and outdoor portions 511, 513 of the CPE/FWA 507), and is generally closed-loop in configuration; i.e., utilizes at least some form of output—here relevant like or performance data—as a feedback input. The controller logic 520 utilizes the CLE/FWA RF front end 601, baseband processor 603, power estimator 605, local database 606, and control system module 609 to implement these closed-loop control functions in controlling the CPE/FWA antenna elements 723 of the array 521 (see FIG. 7B) that are installed e.g., on the rooftop or a façade of the premises, as well as one or more azimuth actuator(s) 608. The actuator(s) can be a mechanical actuators (such as e.g., mechanical assemblies driven by motors capable of precise adjustment such as stepper motors or the like), or electronic actuators (e.g., RF switches, varactors), or combinations of the foregoing. Moreover, as described in greater detail below, each of the antenna elements 723 is also capable of forming transmit/receive beams (see FIG. 7B) at prescribed angles, whether steered mechanically and/or electronically.

The components of CPE/FWA 507 and controller 520 shown in FIG. 6 may be individually or partially implemented in software, firmware or hardware. The RF front end 701 includes RF circuits to operate in e.g., quasi-licensed or unlicensed spectrum (e.g., CBRS GAA or PAL, NR-U, C-Band, etc.). The front-end module 601 converts the radio frequency signals received via the connected antenna element(s) 723 to baseband signals to be processed by the baseband processor 603.

The baseband processor 603 includes baseband signal processing and radio control functions, including in one variant Layer 2 functions such as media access control (MAC).

The power estimator 605 of the illustrated embodiment estimates the signal power based on a path loss model recommended, as described in greater detail subsequently herein.

The power meter 602 measures the received power at one or more antenna ports of the array 521. The measured power information is saved in the database 606, including for formation of historical profiles associated with the various base stations (CBSDs) or other devices with which the CPE/FWA 507 may communicate (e.g., those within signal range, including those identified by the SAS or MSO proxy as described elsewhere herein).

The control system module 609 includes logic which uses the difference from measured and estimated power, and/or historical profile from the database 606, and generates the control data/commands to adjust antenna azimuth and/or tilt. The actuator 608 receive the control commands from the control module 609, and adjusts the antenna element(s) 723 of the array 521 accordingly.

Moreover, in some variants, the power estimator process and control system logic is configured so as to start with, or "fall back" on, purely local or indigenous path loss model selection data and evaluation conducted by the CPE/FWA 507 itself, including for instance in cases of (i) initial pre-provisioning such as for coarse initial adjustments; (ii) during post-provisioning of the device 507, such as propagation environment changes.

It will also be appreciated that various different antenna array configurations are contemplated herein, such as e.g.; (i) one azimuth/tilt actuator per single (discrete) antenna element 723 within an array of multiple antenna elements; (ii) one azimuth/tilt actuator per two or more "ganged" antenna elements (e.g., two or more antenna elements juxtaposed so as to form a common mechanical assembly); and (iii) one azimuth/tilt actuator for a single omnidirectional antenna element. Moreover, the present disclosure contemplates changes in azimuth of the antenna array as a unit; e.g., by rotation of the array around a vertical or other central axis of the array.

Figure 7A:
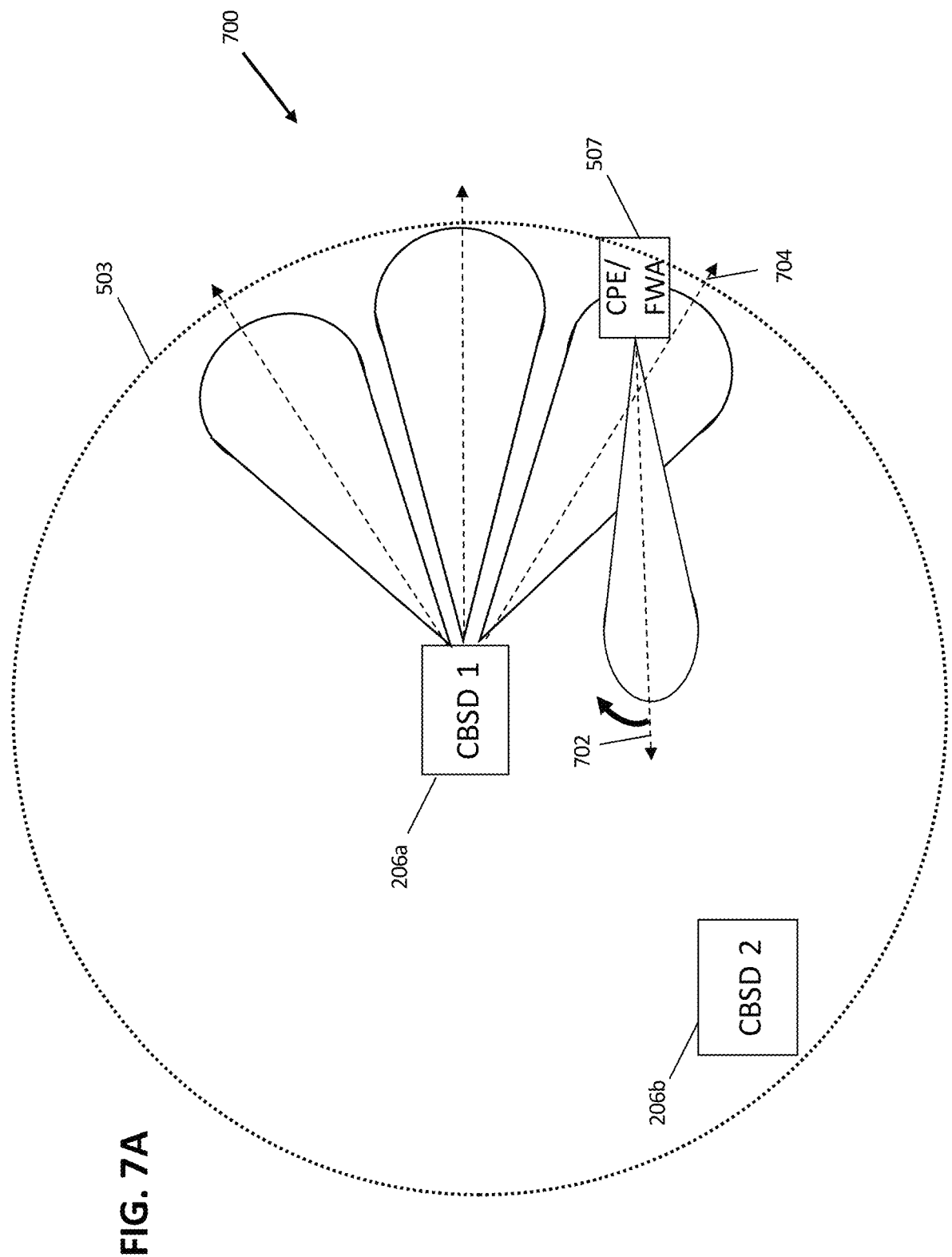
FIG. 7A is a graphic illustrating a CPE adjusting its antenna direction (e.g., azimuth) toward a CBSD within its operating range, according to the present disclosure.

FIG. 7A is a generalized block diagram representing CPE/FWA antenna system optimization in the azimuthal plane 700 according to the present disclosure. As illustrated, the architecture 700 includes an inventive CPE/FWA 507 disposed at/on a premises, and one or more CBSDs (e.g., 206a, 206b) connected to an MSO network via respective data backhauls (not shown). As can be appreciated, optimal DL and UL communication between the CPE/FWA 507 and either of the CBSDs will generally occur when the transmit/receive beams are oriented as the angular reciprocal of one another (i.e., each beam centerline 702, 704 is pointing at the other device). In operation, the CPE/FWA 507 measures the received signal from the CBSDs, and after selecting the more optimized choice (CBSD 1206a in this illustration), optimizes its antenna direction (azimuth, and tilt of so equipped) so as to obtain the maximum SINR.

It will be appreciated that while the discussion herein is cast generally in terms of DL channel characteristics and optimization (i.e., from CBSD to CPE/FWA)—which tends to be much more heavily utilized in practice than the UL—similar approaches to UL optimization may be used as well, including by one or more of the CBSDs. In such cases, the CPE/FWA is the transmitter, and the CBSD the receiver, and hence techniques such as those described herein can be applied to ensure that UL signal quality is maintained while optimizing the DL. Generally, radio frequency propagation paths and channels are symmetric in terms of properties for both DL and UL directions; this holds true especially in the CBSD/FWA context, since mobility of the CPE/FWA is not involved, and channel conditions should change if at all in both UL and DL directions symmetrically.

Figure 7B:
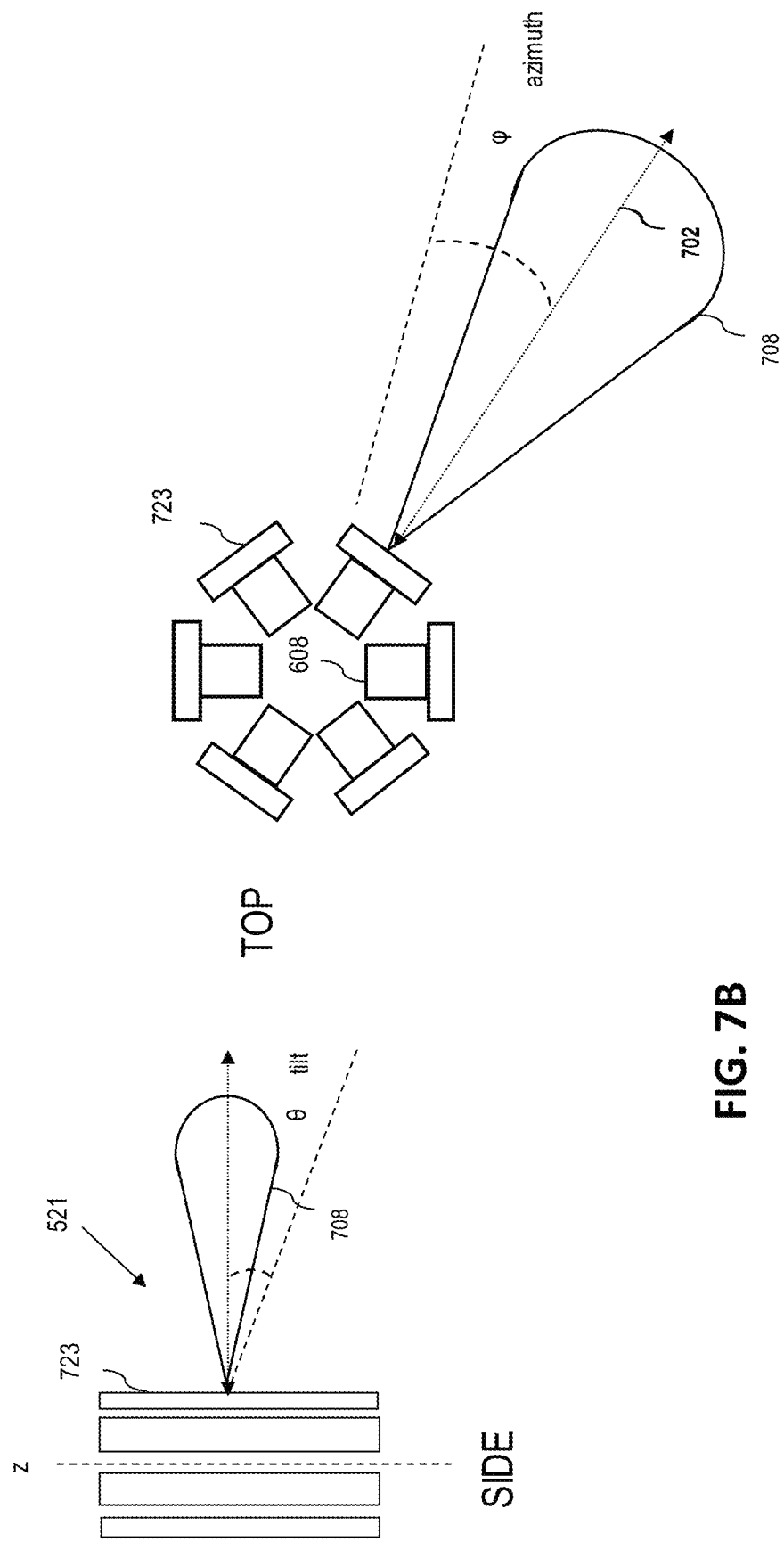
FIG. 7B is a composite view of one embodiment of the articulated antenna apparatus of the disclosure, illustrating top and side views, as well as transmit/receive beam configuration and parameters related thereto.

FIG. 7B is a composite view of one embodiment of the articulated antenna apparatus of the disclosure, illustrating top and side views, as well as transmit/receive beam configuration and parameters related thereto. As shown, this embodiment of the CPE/FWA antenna array 521 includes a plurality (e.g., 6 or 8) individual elongate antenna elements 723 disposed in a generally radial or linear fashion around a central axis (Z). In this embodiment, each element of the array 521 is individually controllable within a prescribed range of azimuth ($\varphi$) angles, such as +/−10 degrees, by corresponding electro-mechanical/electrical azimuth control mechanisms 608 of the type previously described. As such, each antenna element 723 can be individually positioned relative to others in the array 521 so as to e.g., maximize one or more desired parameters such as throughput, SINR, etc.

In general each transmit/receive beam 708 generated by a given antenna element 521 is oriented in a direction 702 orthogonal to the plane of the antenna element face as shown; however, this is but merely one configuration, and the present disclosure contemplates implementations where this is not the case, including electronic generation of beams via two or more discrete elements (including sub-elements of a given antenna element 723, not shown, or by two or more different antenna elements). Beam dispersion can also be adjusted via e.g., electronic means or use of narrow dispersion antenna elements; this approach has the advantage of reducing unwanted overlap or interference with other antenna elements of the same CPE/FWA, as well as other CPE/FWA that may be operating in the area. This capability is enabled in large part due to the post-installation adjustment capability of the inventive CPE/FWA 507; under prior art paradigms, not only would precise alignment of such narrow dispersion beams with a serving base station be required at initial installation in order to obtain sufficient channel quality, but such installations would also be unforgiving in terms of subsequent (post installation) variations in position, changes in RF propagation paths due to man-made or other sources, removal or deactivation of the serving base station, etc. In contrast, the inventive CPE/FWA 507 may, whether autonomously or with network assistance, dynamically reposition itself under such scenarios to re-acquire the serving base station (or establish connection with a new one), all without need for service personnel intervention at the premises.

The foregoing combination of narrow beam dispersion and dynamic adjustment capability also cooperate to enable, inter alia, higher CPE/FWA and customer density within a given geographic area. Specifically, interference levels generated by each antenna element of the CPE/FWA 507 for neighboring elements (and neighboring CPE) are reduced due to narrow dispersion (i.e., the beams can be very precisely pointed in a desired direction and maintained that way throughout the installation lifetime of the CPE/FWA), and hence more CPE/FWA can be packed into a neighborhood, city, region, etc. without exceeding requisite interference levels for each operating CPE. As a coarse analogy, many more conversations can co-exist in a finite room full of people when each is whispering into another's ear, as opposed to trying to shout over the prevailing din. As such, radiated RF energy (as measured by e.g., EIRP) from each antenna element can be reduced without sacrificing channel quality or throughput as compared to systems with less precise/broader dispersion transmit/receive beams.

As discussed in greater detail below, the foregoing advantage can also be leveraged by the network at a higher level of abstraction; by utilizing narrow beam widths and maintaining precise alignment over time for each antenna element in use, and replicating such functionality across all managed CPE/FWA within a given area, the network operator (process) can maximize throughput across the managed CPE/FWA of its customers, whether on an individual or statistical basis. For instance, where two candidate CBSDs emerge as the best options for a given CPE/FWA installation, network processes 803 (such as at the MSO core 839—see FIG. 8) can be consulted in order to determine whether one CBSD selection (and associated antenna alignment) is preferable to another from a network (versus CPE) perspective; e.g., to mitigate interference to another CPE/FWA.

Figure 8:
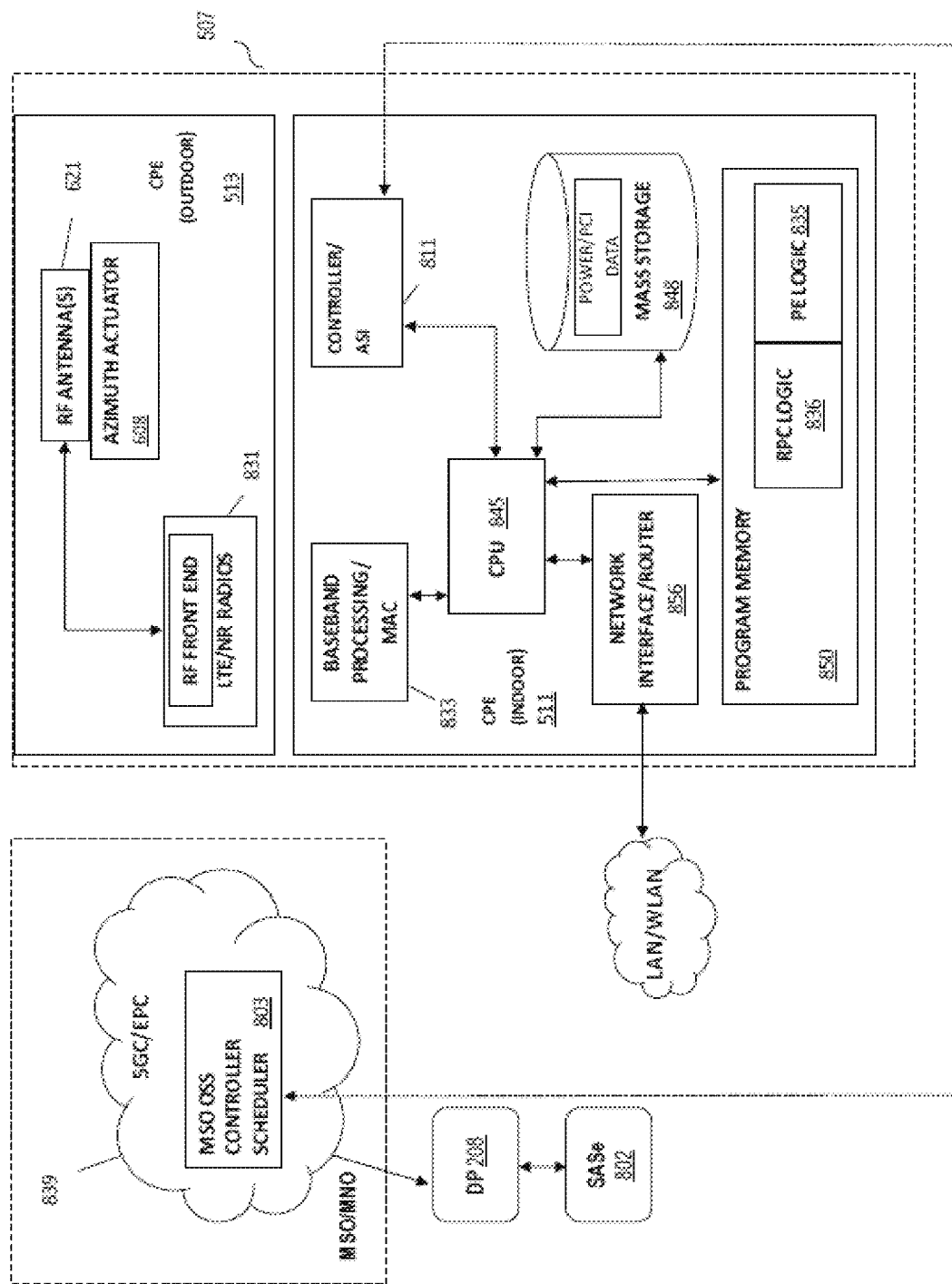
FIG. 8 is a functional block diagram illustrating one embodiment of an exemplary CPE/FWA apparatus with antenna adjustment capability according to the present disclosure.

FIG. 8 illustrates an exemplary implementation of a CPE (e.g., FWA or other device) 507 configured according to the present disclosure. As shown, the CPE/FWA includes, inter alia, a CPU processor apparatus or subsystem 845, a program memory module 850, mass storage 848 (including a database with RF data relating to various detected CBSDs or other entities proximate to the CPE/FWA 507), CPE/FWA controller logic module 811, one or more front end wireless network interfaces 831 for communication with the RAN e.g., CBSD/xNB, and the MSO network 839, as well as one or more back end network interfaces with integrated router 856 such as for establishment of a WLAN AP or Ethernet LAN within the served premises, Gigabit Ethernet or other LAN connectivity, support of home or premises gateways, DSTBs, etc. within the premises, and for communicating with e.g., local equipment such as test/configuration devices or terminals.

The CPE/FWA 507 may also be communicative with a SASe 802 (i.e., one enhanced for the functionality described herein, including selection of path loss models and target CBSDs as described below with respect to FIGS. 10-15) via a DP 208, which in one embodiment is accessed via the MSO core (e.g., via a backbone of the MSO data network). Other communication channels "between" the CPE/FWA and SASe 802 may also be used (whether direct or via one or more proxies), as described below with respect to FIG. 10.

At a high level, the CPE/FWA 507 includes two (2) sub-elements; i.e., an outdoor portion 513, and an indoor or processing portion 511. The outdoor portion 513 in the exemplary embodiment includes one or more antenna azimuth actuators 608 (see FIG. 6), as well as RF front end components necessary for receipt and processing of the RF signals, including logic to determine radio path parameters of interest such as amplitude/RSSI, phase, timing.

As indicated by its name, the CPE outdoor module or radio head 513 is typically disposed on a premises structure (e.g., rooftop, tower, utility pole, etc.) outdoors so as to minimize intervening interfering structures and RF signal attenuation as much as possible. The indoor unit 511 is in communication with the outdoor unit via e.g., interposed coaxial cable or other medium, and includes logic responsible for detecting and demodulating the received RF signals from different paths (received via e.g., different ones of the antenna elements 723) and combining them into one logical data stream (and converting to an appropriate protocol for distribution within the premises such as IEEE Std. 802.3 Ethernet packets. Combination of the received constituent signals (e.g., user data accessed via the assigned TDD slots and carrier(s) and beams) is accomplished in one embodiment via stream, CBSD/xNB and beam ID data (i.e., each stream of data from the different beam from the same CBSD/xNB 206 will have unique ID data that can be used to temporally reconstruct the packet data associated with that stream in proper order and relation).

In the exemplary embodiment, the processor 845 may include one or more of a digital signal processor, microprocessor, field-programmable gate array, GPU, or plurality of processing components mounted on one or more substrates. The processor may also comprise an internal cache memory, and is in communication with a memory subsystem 850, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 845.

The processor 845 is configured to execute at least one computer program stored in memory 850 (e.g., a non-transitory computer readable storage medium); in the illustrated embodiment, such programs include logic to implement the power estimator (PE) functions, and radio path controller logic (RPC) 836. Other embodiments may implement such functionality within dedicated hardware, logic, and/or specialized co-processors (not shown).

The CBRS stack of the CPE/FWA 507 is implemented and controlled via the RPC controller process (logic) 836 of the CPE/FWA such that CBSD/xNB-to-CPE communication protocols are used to enable the RF detection and reporting, and scheduling, including CPE/FWA functions such as (i) generation and transmission of periodic, on-demand or ad hoc RF detection reports during operation; and (ii) receipt of network controller-generated TDD slot, carrier, and CBSD/xNB and wireless beam assignments. The logic 836 may also manage other aspects of CPE/FWA operation, including "intelligent" monitoring and storage of data for use in e.g., historical characterizations of the various CBSD/xNB in radio range of the CPE/FWA in terms of signal strength, signal stability, azimuth, receive beam configuration, cell or base station identifiers, and the like. Management of SRS and CRS data obtained by the CPE/FWA 507 is also performed in one embodiment by the RPC logic 836.

The PE logic 835 and controller logic 836 enable measuring the received power, estimating the power level, updating the estimation model parameter, and storing power data and other data (e.g., RF parametric data) in the database, tracking the received signal from several base stations, and selecting the best serving base station as described elsewhere herein in detail, including generation of the control commands for adjusting antenna azimuth and in order to optimize channel or link performance and mitigate interference after the best candidate CBSD is selected.

The controller logic 811 also includes an antenna system interface (ASI) which is a physical and logical control interface for the tilt actuator 608 of the external portion 513 of the CPE/FWA 507. In one implementation, this interface uses a signaling protocol of the type know to those of ordinary skill in the control system arts to (i) provide data representing commands for actuation of the actuator to a desired position or state (depending on whether electro-mechanical or electronic, as well as (ii) data indicative of actual position of the affected antenna element(s) so as to determine actual versus commanded position (e.g., from a position sensor, limit switch, or other such mechanism of the antenna array apparatus 521). This interface can advantageously be implemented using comparatively low complexity and bandwidth technologies and protocols due to its low overhead; "feedback" for the closed-loop control system (FIG. 7) is obtained via analysis of RF data, each obtained via the RF front end 601 by the baseband processor 603 of the CPE/FWA 507, thereby obviating any high-bandwidth data flow over the ASI.

Figure 9:
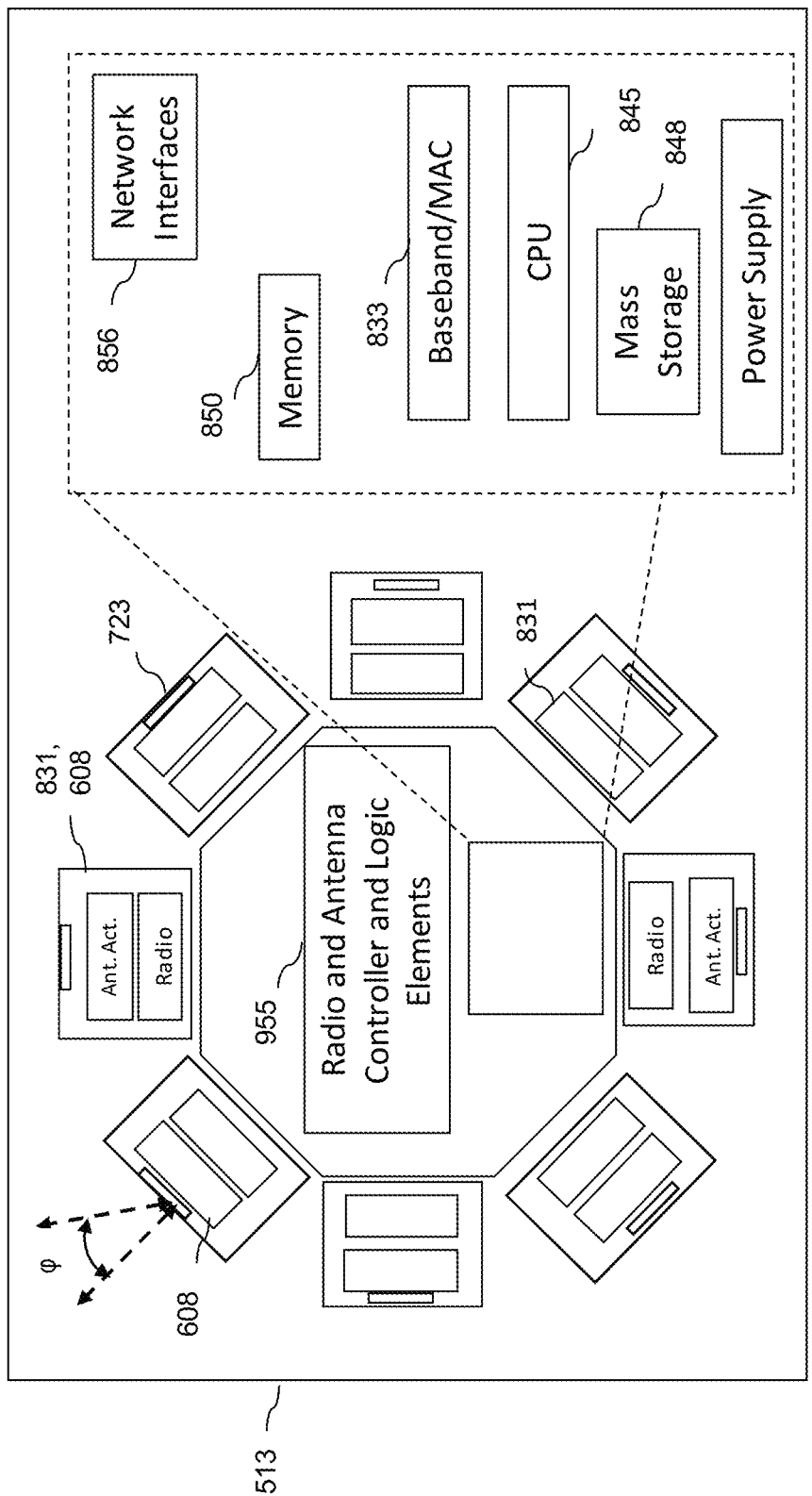
FIG. 9 is a functional block diagram illustrating another embodiment of an exemplary CPE/FWA apparatus and hardware components, including antenna adjustment capability, according to the present disclosure.

FIG. 9 illustrates an alternate embodiment of the external portion 513 of the CPE/FWA apparatus 507 of the disclosure, wherein an array of individual radio front end elements 601 and associated actuators 608 support each of a plurality of antenna elements 723, the latter which are adjustable in azimuth (and optionally tilt) by the respective actuator. This embodiment utilizes a plurality of configurable logic blocks (CLBs) in support of the RF and power measurements and estimation needed for the control system, and the control system logic itself may be supported within one or more CLBs of the FPGA. Exemplary implementation details for the embodiment of FIG. 9 are described in co-pending U.S. patent application Ser. No. 16/741,509 filed Jan. 13, 2020 and entitled "METHODS AND APPARATUS FOR RADIO CONFIGURATION IN A WIRELESS SYSTEM," previously incorporated herein by reference in its entirety.

Methods—

Figure 10:
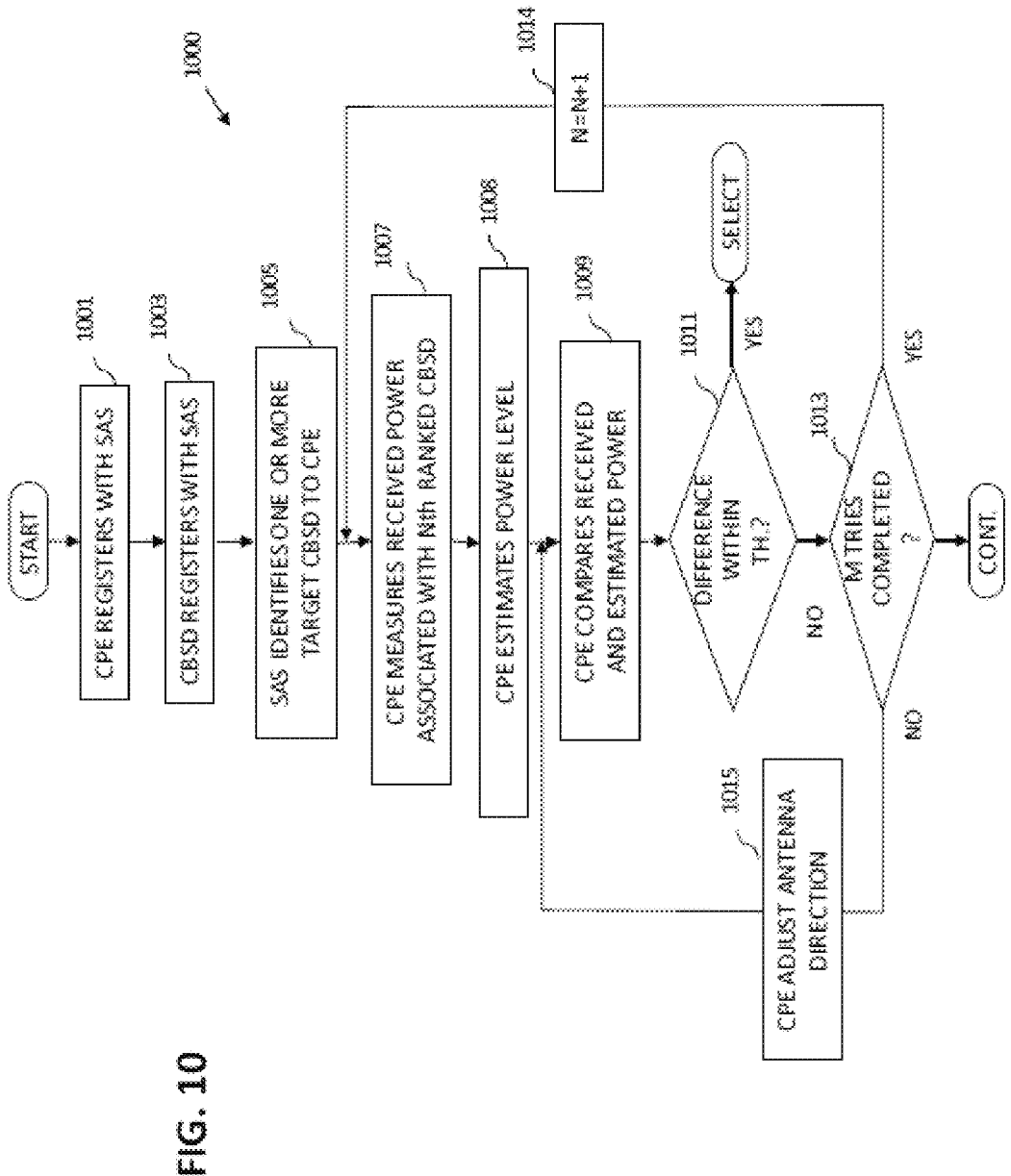
FIG. 10 is a logical flow diagram of a first embodiment of a general methodology for CPE/FWA base station selection and antenna optimization according to the present disclosure.

Referring now to FIG. 10, one embodiment of a generalized methodology for optimizing antenna configuration of a CPE/FWA according to the present disclosure is shown and described.

Per step 1001 of method 1000, the CPE/FWA 507 registers with the SASe 802 by sending its physical location, as well as its network topological location (e.g., IP address in one embodiment). As discussed in greater detail below, various direct and indirect mechanisms for communication of the CPE/FWA data to the SASe are contemplated within the present disclosure, including without limitation (i) transmission of the data from an installer device such as a mobile device or laptop to the SAS via e.g., a third party network (e.g., Internet) or MSO network; (ii) direct transmission to the SAS via a secondary network channel or backhaul (e.g., co-located DOCSIS modem, LoRa low-bandwidth wireless channel, satellite channel, etc.), and (iii) use of an MSO network process (e.g., within the core 839) acting as a proxy for the CPE/FWA until it can establish wireless communication with a CBSD 206 (see FIG. 16B).

In some embodiments, the CPE/FWA 507 first attaches to a given CBSD (e.g., using 3GPP RACH and related procedures), and connects with that CBSD as a second step. After this initial connection, the CPE/FWA can send limited traffic in the UL, and can receive limited traffic in DL. However, the CBSD does not yet confirm to the CPE/FWA that the CPE/FWA can receive "full" traffic in the DL or send full traffic in the UL; rather, only a limited amount of traffic (e.g., a protocol-based "ping" as described below) is allowed between the CBSD and CPE/FWA. Substantive (user plane) traffic communication between the CBSD and CPE/FWA occurs only after the CPE/FWA determines the best or optimized antenna direction/configuration.

Additionally, in one exemplary approach, one or more path loss models (e.g., similar to those used by the SAS) may be stored in the CPE/FWA such as at time of manufacture, programming, or installation. The network operator (e.g., MSO) who installs and maintains the CPE/FWA will be aware of these models, and once the CPE/FWA established a connection with relevant CBSD, these models can be updated if required, such as by the SAS or an MSO proxy node based on additional data obtained thereby relating to environment, other interferers, topographical environment, etc. If the pre-installed model(s) require no changes, than no update is performed.

Per step 1003 of method 1000, one or more CBSDs 206 register with the SASe by sending physical location data (as required), as well as its network topological location (e.g., IP address in one embodiment). As with the CPE/FWA discussed above, the CBSDs may use different channels for communicating such data with the SAS, including direct means (e.g., via a network connection, the SASe accessing an MSO API to return CBSD data, etc,), as well as indirect means (e.g., via MSO proxy transmitter or network process or the like).

In one variant, the SASe manages a plurality of registered base stations (CBSDs) via a database in order to keep track of the identification and location (physical and network) of each base station.

Per step 1005, the SASe 802 identifies one or more target CBSDs to the CPE/FWA. In one variant, the identified CBSD(s) can be one or more base station(s) that is/are physically closest to or within a prescribed range of the CPE/FWA 507, or otherwise bear some desired relationship. For instance, depending on configuration, the SASe may be equipped to identify topological or other features or aspects (such as strong interferers) between the target CPE/FWA and a given CBSD which would eliminate the CBSD from further consideration for use by the CPE (or at least reduce its renking relative to other candidate CBSDs).

Per Step 1007, the CPE/FWA measures the received power from the reference training signal embedded in data frames sent transmitted from one or more of the CBSDs to the CPE/FWA.

As discussed elsewhere herein, various CBSD evaluation/selection routines are contemplated, such as e.g., (i) measure all, rank, then select, or (ii) evaluate in sequential order, and select the first qualifying CBSD.

Per step 1008, the CPE/FWA computes and estimation of the power level, such as based on a selected path loss model recommended by the SASe. In one variant, the SASe 802 selects a path loss model that best fits the characteristics of the relevant propagation environment between the (fixed) CBSDs and CPE/FWA. The SASe sends the path loss model data, such as parameters (e.g., n, σ, d, d0, discussed below) to the CPE/FWA 507, such as via one of the aforementioned communication channels. As previously noted, the CPE/FWA can be configured initially with one or more path loss models, such that the SASe need only send particular parametric data to configure or update the model.

Per 1009, the CPE/FWA calculates the difference between the actual received and estimated power. If the difference between the received and estimated power meets one or more criteria (e.g., is within a prescribed threshold), the received SINR is considered "maximized," and the current antenna direction is optimized towards the CBSD under evaluation. In this case, the CPE/FWA selects this CBSD for connection, and truncates the process.

If the difference between the received and estimated power is not within the criterion/threshold, the received SINR is not considered maximized, and the antenna direction needs to be adjusted to attempt to further maximize the receive SINR. In this case, the CPE/FWA proceeds to step 1013 to determine whether enough attempts at adjustment (M) have been met, and if not, adjust the antenna direction towards the CBSD under evaluation per step 1015. If M is met, then the CPE/FWA increments the CBSD counter (N) per step 1014, and proceeds to evaluation of the next CBSD per step 1007.

FIG. 11 is a logical flow diagram illustrating one implementation of the method of FIG. 10, specifically relating to CBSD evaluation and selection by the SASe. As shown in FIG. 11, step 1005 of the method 1000 of FIG. 10 (described above) is in this implementation generally configured to assess various known CBSD "candidates" for use by the target CPE/FWA 507 in subsequent tuning and optimization of the CPE. Specifically, at step 1023, the SASe (or a proxy process thereof, such as a third party server) first determines the location of the target CPE/FWA via registration of the CPE/FWA with the SASe utilizing normal CBRS registration procedures. In one configuration, the CPE/FWA identifies itself by unique identifying data such as a network-assigned ID, its IP or other network address, etc., as well as providing configuration data which may include number of active/usable sectors (and their corresponding centerline azimuth/elevation values), mounted elevation above sea level, and location (e.g., lat/lon) if not already known to the SASe. For instance, on a new installation of the CPE, the CPE/FWA may never have been "turned on" before, and hence the SASe may know little about its particular configuration and placement. As such, the present disclosure contemplates use of various differentiated levels of information reporting during registration with the SASe, depending on the existence of any prior registrations, interim changes to configuration of the CPE/FWA, etc.

Per step 1025 of FIG. 10A, the SASe utilizes the registration data obtained from the target CPE/FWA per step 1023 to identify one or more known CBSDs (i.e., those which have registered with the SASe) meeting a prescribed spatial criterion relative to the target CPE. For instance, as shown, the criterion might be a prescribed radius relative to the (known) CPE/FWA location, based on the power categorization or maximum EIRP of the CPE. CBSD locations are known based on, for instance, their prior installation and registration with the SASe. This identification process results in a first-level CBSD candidate list.

Next, per step 1027, the SASe filters the first-level list of candidates based on one or more filtering criteria. In one approach, the SASe utilizes any restrictions or configuration data provided to the SAS during CPE/FWA registration. Say for example the target CPE/FWA is installed at a height of 100 feet above sea level on a building façade, such that it can only feasibly utilize about one-half of its total 360-degree range of azimuth (with the other half being blocked by the building to which it is mounted). If the SASe knows that the CPE/FWA has e.g., six (6) active sectors, three of which will be blocked, it can utilize the data relating to the beam centerline and dispersion associated with these three (available) sectors—and the known lat/lon location of the CPE/FWA—to identify non-eligible ones of the first-level candidate CBSDs. That is, while certain CBSDs are within range in an unobstructed propagation model, reality is that say two of five candidate CBSDs have no LOS or other viable propagation path to/from the target CPE, and hence can be removed from further consideration.

Note that the CPE/FWA may also utilize the elevation data provided by the CPE/FWA (or obtained from other sources, such as an installer/MSO installation report or registration) as well as digital topological/feature maps to determine if at least putatively, there are no direct natural or other obstructions between the CPE/FWA and each of the candidate CBSDs. For example, consider a rural installation of the CPE, where three (3) candidate CBSDs are within putative wireless range of the CPE, and the CPE/FWA has full 360-azimuth capability (i.e., is on an unobstructed rooftop or the like). A digital topographic map of that rural area may reveal that a 500-foot tall hill is disposed in LOS between a first candidate CBSD and the CPE, using comparatively rudimentary trigonometric analysis (e.g., modeling the hill as a cone, and knowing the heights of the CPE/FWA and the candidate CBSD antenna array. As such, that CBSD could be filtered form the second-level (filtered) candidate list generated per step 1027. Similarly, for urban areas where building locations, orientations, and configurations are well known, such modeling may be used to identify CBSDs which may have obstructed propagation paths to/from any given CPE/FWA installation.

Advantageously, the CPE/FWA can be comparatively "thin" in terms of processing power and data processing capability/algorithms in some embodiments, since the CBSD candidate selection algorithm can be wholly off-loaded to a cloud process if desired. Such calculation may even be simplified to the point of becoming e.g., an Amazon Alexa-enabled "skill", such as where an installer or even customer can, if needed, obtain the data for candidate CBSDs via input of data (e.g., height, number of sectors, lat/lon) for the CPE/FWA via a smartphone app, and the AWS/skill accesses SAS (or proxy) network-facing APIs to return a suitable candidate list.

Returning to FIG. 11, per step 1029, the SAS then ranks the second-level list candidates in order of precedence (e.g., based on distance, anticipated interference level/load, and/or other parameters of interest), and provides the ranked list data to the CPE/FWA (or a proxy thereof) per step 1031.

Figure 12A:
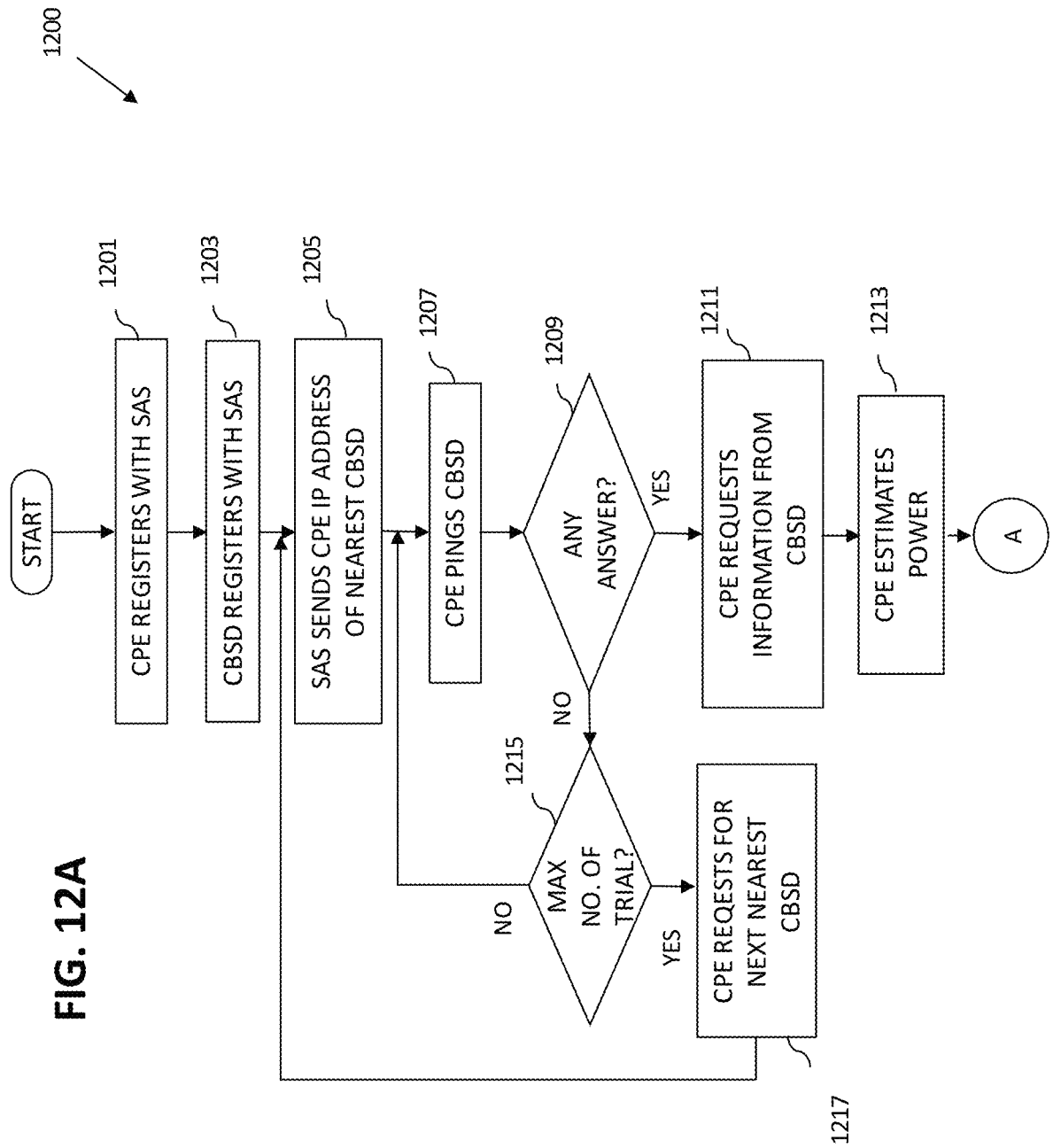
FIGS. 12A-12B are a logical flow diagram illustrating another exemplary embodiment of the general methodology FIG. 10.
Figure 12B:
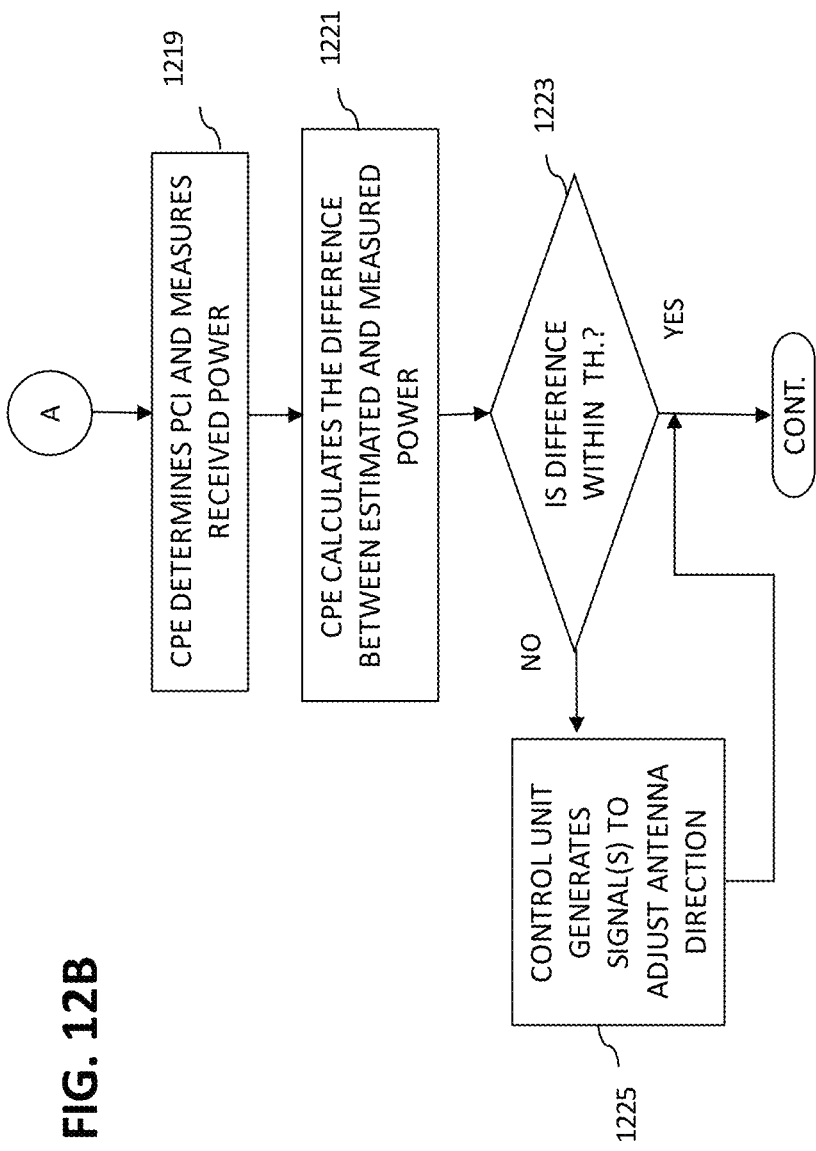

Referring now to FIGS. 12A-12B, one implementation of the methodology FIG. 10 is shown and described.

Per step 1201 of method 1200, the CPE/FWA registers with SAS by sending its physical location, as well as its network location (e.g., IP address), as previously described.

Per step 1203, one or more CBSDs 206 register with the SASe by sending physical location data (as required), as well as its network topological location (e.g., IP address in one embodiment). As with the CPE/FWA discussed above, the CBSDs may use different channels for communicating such data with the SAS, including direct means (e.g., via a network connection, the SASe accessing an MSO API to return CBSD data, etc,), as well as indirect means (e.g., via MSO proxy transmitter or network process or the like).

Per step 1205, the SASe 802 identifies a base station that is physically closest to the CPE/FWA 507. The SASe can for example reference the physical location of the requesting CPE, and the database comprising a plurality of physical locations of a plurality of registered base stations, for performance of this step. Then, by merely comparing a distance of a direct path between the CPE/FWA and each of the plurality of base stations, the SASe can return the identification of the physically closest base station in response to the request from the CPE. More sophisticated approaches, such as those described above with respect to FIG. 11, may be utilized as well.

Per step 1207, based on the IP address of the CBSD, the CPE/FWA "pings" the CBSD (e.g., using a simple CLI-type approach or command to transmit a ping to the AAAA.BBBB.CCCC.DDDD IP address (IPv4 or IPv6) of the CBSD). This can be accomplished directly from the CPE/FWA such as using the limited connection between the two devices as previously described, via a secondary communication channel exists (e.g., another backhaul, or separate communication channel), or alternatively indirectly via an installer or client device, or even as initiated from a network-based MSO proxy process with which the installer or CPE/FWA itself is communicative.

Per step 1209, if there is any response from the CBSD, the method proceeds to step 1211, and the CPE/FWA requests data from the responding CBSD. Per step 1211, the CPE/FWA in one embodiment requests (i) number of sectors associated with the CBSD, (ii) Physical Cell Identity (PCI) for each sector, and (iii) transmit power for each sector (e.g., in dBm). Spatial data for each sector may also be provided, such as where the azimuth and/or tilt of beam centerline for each sector is provided.

If there is no response, the CPE/FWA proceeds to step 1215, wherein if the maximum number of trials has not been reached, the method proceeds to step 1207, and pings the CBSD again. If the maximum number of trials has been reached, the method proceeds to step 1217, and the communicates with the SASe to find the next closest base station that may respond to a ping from the CPE/FWA. Note that in one variant, the SASe downloads a prioritized list of CBSDs and their IP addresses to the CPE/FWA in a e.g., an IE (information element) or file, such that the CPE/FWA need only contact the SASe once.

Per step 1213, the CPE/FWA estimates the power for each sector identified by the CBSD via the data transmission, based on a selected path loss model as described elsewhere herein. In one variant, the SASe elects and sends CPE/FWA the path-loss model including the model parameters (e.g., n and σ, d, d0). In another variant, the CPE/FWA selects the model that best fits the environment characteristic based on training data, and estimates the model parameters by regression methods. For instance, the CPE/FWA may select a channel model based on the historical power profile stored in its database, and estimates the model parameters based on training data provided in the data frames from the SASe 802.

In some variants, the CPE/FWA 507 also includes logic which enables it to monitor the model performance, and dynamically update one or more of the model parameters, such as if any propagation characteristic changes in the environment.

Per step 1219, the CPE/FWA 507 measures the received power level for each sector. The received power is measured by computing the power of the reference signals which are known to the CPE, and embedded in the data frames associated with the PCI of each sector (i.e., the CPE/FWA knows from which sector of the CBSD the signals it is measuring based on PCI).

Per step 1221, the CPE/FWA calculates the difference between the estimated sector power of step 1213, and the measured or actual power of step 1215.

Per step 1223, if the difference between the estimated sector power and measured power meets a prescribed criterion (e.g., is within a threshold difference value), the CPE/FWA does not perform any antenna direction optimization. However, if the difference between the estimated sector power and the measured power is higher than a threshold (indicating that the actual power reaching the CPE/FWA is below that estimated under the model(s) that have been applied in the estimation), the CPE/FWA proceeds to step 1225, and adjust its antenna direction to receive the maximum signal power from the CBSD.

Figure 13:
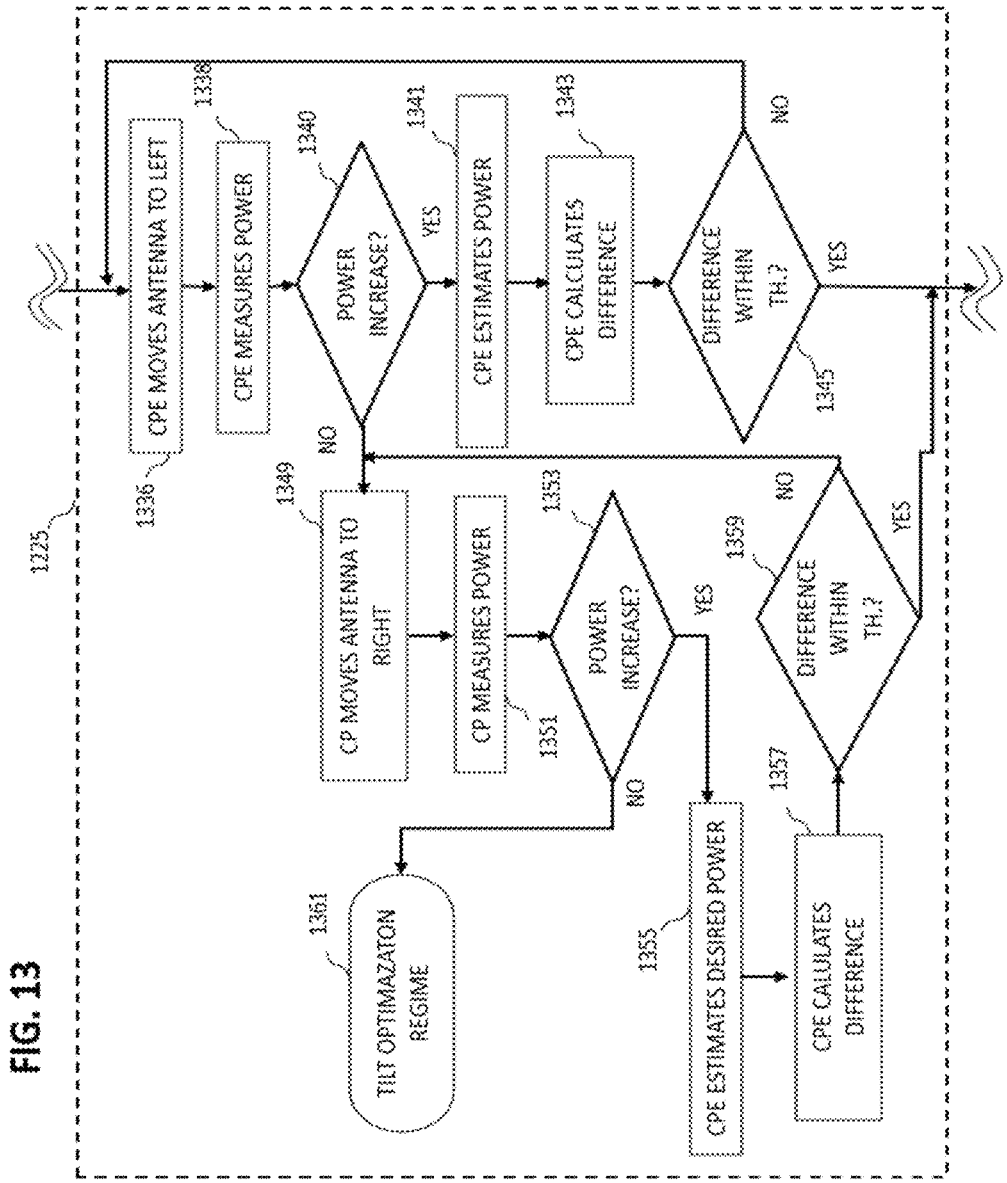
FIG. 13 is a logical flow diagram of one implementation of the method of FIGS. 12A-12B, specifically relating to control signal generation thereby.

FIG. 13 is a logical flow diagram illustrating one specific implementation of a method for adjusting antenna direction (step 1225) using the control mechanism to optimize antenna direction according to the disclosure.

Per step 1336, the CPE/FWA 507 moves antennas direction to the left by a prescribed amount (α degrees), and measures the received power at step 1338.

Per step 1340, if the power increases, the direction of antennas movement is putatively correct. Accordingly, the CPE/FWA logic proceeds to step 1341, and estimates the sector power.

Per step 1343, the CPE/FWA calculates the difference between the desired power, and the estimated sector power. If the difference is within the threshold, then an "optimum" antenna direction is found, and the CPE/FWA proceeds to processing and decoding the received data upon connection establishment (e.g., RRC_Connected state).

Conversely, if the power decreases at step 1340, the direction of antennas move is not correct, and the CPE/FWA logic proceeds to step 1349, and moves the antennas to the right by a prescribed increment (e.g., 2×α degrees, to compensate for the prior move and add additional azimuth change).

Per step 1351, the CPE/FWA measures the received power at the new azimuth, and checks if the power increases at step 1353. If the power increases, the CPE/FWA estimates the sector power at step 1355.

Per step 1357, if the difference between the estimated sector power and measured power meets the prescribed criteria, the CPE/FWA logic does not perform further antenna direction optimization. However, if the difference between the estimated sector power and the measured power is higher than the threshold, the CPE/FWA proceeds to step 1361, and adjust its antennas direction to receive the maximum signal power from the CBSD using a tilt optimization protocol or regime (which may iterate back and forth with the azimuth regime of FIG. 13).

It will be appreciated that while the foregoing discussion is cast, for purposes of illustration, in terms of single incremental changes in angle, and in one direction at a time, other schemes may be used consistent with the disclosure. For example, in one variant, the method 1225 of FIG. 13 may be adapted to conduct multiple "stop and measure" steps in one direction, using consistent or varied increments of change in azimuth or tilt, followed by a similar procedure in the opposite direction, and only after collecting sufficient data, commence antenna adjustment. In another variant, a "random walk" algorithm is used to allow the e.g., azimuth to vary left or right from a then-current position, so as to enable characterization of the signal strength at various points. As another option, a more programmatic scan such as a raster or conical scan (akin to those used by radar systems) may be employed for such purposes. Many other variants will be appreciated by those of ordinary skill given the present disclosure.

Figure 14:
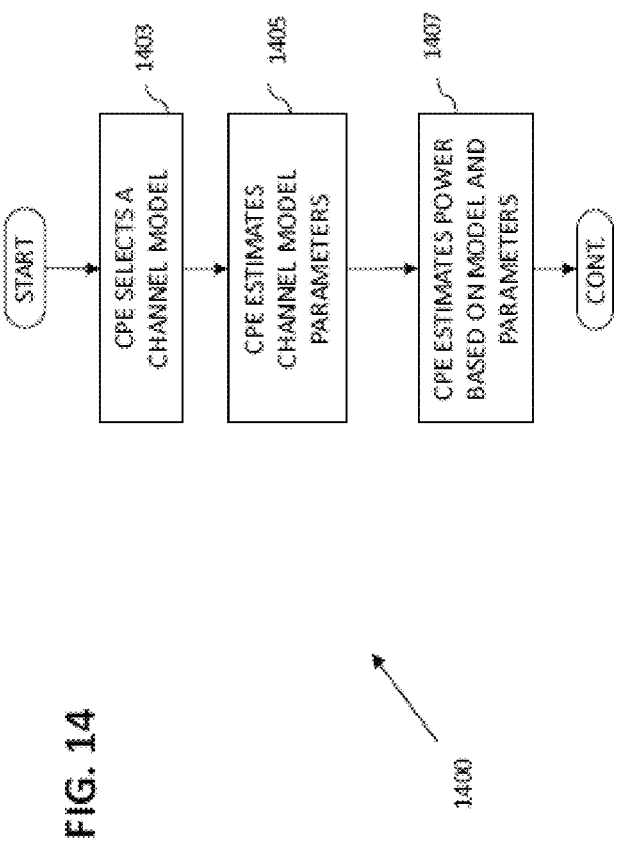
FIG. 14 is a logical flow diagram of one exemplary embodiment of a general methodology for path loss model selection according to the present disclosure.

FIG. 14 illustrates one embodiment of a generalized methodology for path loss model selection and parameter estimation according to the present disclosure.

As a brief aside, a short discussion on path loss propagation models is useful at this juncture.

Path Loss models are used to predict large-scale coverage for wireless communication system design, implementation and deployment. By using path loss models, processes such as the CPE/FWA 507 can estimate the received power as a function of e.g., distance, and can predict the SINR which should be achievable from e.g., certain sector of a CBSD transmitting at a certain power level.

The propagation models used generally indicate that average received signal power decreases logarithmically with the distance between transmitter and receiver. A path loss model for an arbitrary transmitter receiver separation can be expressed as a function of distance, and an exponent, n as in Eqn. (1):

$$PL(\text{dB}) = PL(d0) + 10n\log\left(\frac{d}{d0}\right) \quad \text{Eqn. (1)}$$

Where:
n is the path loss exponent which indicates the rate at which path loss increases with distance;
d0 is the close-in reference distance; and
d is the transmitter receiver distance.

Equation (1) shows that the power decreases proportional to $(1/d)^n$, as the distance d between transmitter and receiver increases. The exponent n depends on the specific propagation environment. Table 1 shows exemplary values of the exponent n for different environments.

TABLE 1

| Environment | Path Loss Exponent n |
| --- | --- |
| Free Space | 2 |
| Urban Area | 2.7 to 3.5 |
| Shadowed Urban Area | 3 to 5 |
| In Building Line-of-Sight | 1.6 to 1.8 |
| Obstructed in Building | 4 to 6 |
| Obstructed in Factories | 2 to 3 |

The reference model of Eqn. (1) is defined via field measurement at distance d0 from the transmitter.

Log-Normal Shadowing—

The model in Eqn. (1) does not consider the fact the propagation environment can have different propagation characteristic. Therefore, in some scenarios where the environment surrounding transmitter and receiver are different, the estimated power from Eqn. (1) is vastly different than the measured signal. As the measurement in the field has shown, the path loss PL(d) at distance d from a transmitter is random has a log-normal distribution as defined by Eqns. (2) and (3):

$$PL(d) = PL(d0) + 10n\log\left(\frac{d}{d0}\right) + X\sigma \quad \text{Eqn. (2)}$$

where $X\sigma$ is a zero-mean Gaussian random variable with standard deviation $\sigma$, and $$P_{RX}(d) = P_{TX}(d0) - PL(d) \quad \text{Eqn. (3)}$$

The log-normal distribution describes the shadowing effects which occur in in applications which have the same transmitter receiver distance, but have different propagation environments such as different presence of obstacles (e.g., building, mountains, towers). The close-in reference distance do, the path loss exponent n, and the standard deviation $\sigma$ define the path loss model for transmitter receiver separation distance d. The path-loss model of Eqn. (2) can be used to estimate the received power from a given CBSD 206 at the CPE/FWA antenna elements 723.

Table 2 below shows exemplary path loss exponent n values and shadowing standard variation $\sigma$ for different environments based on measurements, reported in "*Wireless and Cellular Communications*", Thomas Schwengler, First Edition, December 2019 which is incorporated here herein by reference in its entirety.

TABLE 1

| Source | Frequency (GHz) | Path Loss Exponent n | $\sigma$ (dB) | Comments |
|---|---|---|---|---|
| Seidel | 0.9 | 2.8 | 2.8 | Suburban |
| Erceg | 1.9 | 4.0 | 4.0 | Terrain category |
| Feuerstein | 1.9 | 2.6 | 2.6 | Medium Antenna height |
| Abhayawardhana | 3.5 | 2.13 | 2.13 | |
| Durgin | 5.8 | 2.93 | 2.93 | Residential |
| Porter | 3.7 | 3.2 | 3.2 | |
| Rautianinen | 5.3 | 4.0 | 4.0 | |
| Schwengler | 5.8 | 2.0 | 3.5 | LOS |
| | 5.8 | 3.5 | 9.5 | NLOS |
| | 3.5 | 2.7 | 11.7 | Near LOS |

The n and $\sigma$ values depend on different propagation environments (e.g., downtown, urban, rural) and operating frequencies as specified in Tables 1-2 above. The values n and $\sigma$ are initially determined at the time of the installation according to propagation environment as specified in Table 1-2. However, since the propagation environment may change, embodiment of the CPE/FWA 507 may dynamically perform parameter estimation and update n and $\sigma$ values during e.g., the training period of the received data frame, and report the new values to the SASe 802. The value PL(d0) is generally a fixed value, and is measured at the time of installation of CPE/FWA in close-in measurement at distance d0 from transmitter, such as by an installer or other approach.

Returning now to FIG. 14, per step 1403 of method 1400, the CPE/FWA 507 selects a path loss model that fits the propagations environment characteristics. For instance, in one embodiment, the CPE/FWA selects the pass loss model based on analyzing the measurement data stored in its local database (or a network accessible database), and determines which models best fit the propagation environment characteristics. For example, evaluation algorithms might evaluate a predetermined (limited) set of parameters for each candidate model from a plurality of candidate models, based on in situ data obtained by the CPE/FWA.

Per step 1405, the CPE/FWA 507 estimates the path loss model parameters (e.g., exponent n, variance a), or selects the path loss model from its data base. The model parameters are estimated in one embodiment by application of curve fitting method that minimizes the mean error between the estimated values and real (measured) values. The distance d between transmitter and receiver is estimated from the sounding reference signals, or can be determined by way of data provided to the CPE (by SASe or the MSO core, the latter having knowledge of its own CBSD placements) and the location of the CPE itself—e.g., via use of lat/lon data for both devices to determine straight-line distance.

Lastly, per step 1407, the CPE/FWA estimates the sector power based on the selected model and associated parameters from step 1405. This procedure can be repeated for each sector as needed.

Various aspects of the foregoing analysis and model/parameter selection can be performed by algorithms resident on the CPE (such as stored in program memory or mass storage), and/or can be offloaded in whole or part to e.g., cloud processes, including in more sophisticated approaches such as those based on ML or DL (machine learning or deep learning), whether within an MSO compute environment or an external cloud process such as AWS or Azure. As such, the MSO may also build their own more detailed or customized path loss models and parameter sets for its own CBSDs and CPE/FWA, rather than relying on more generic models which may be provided by the SASe 802 in some cases.

Figure 15:
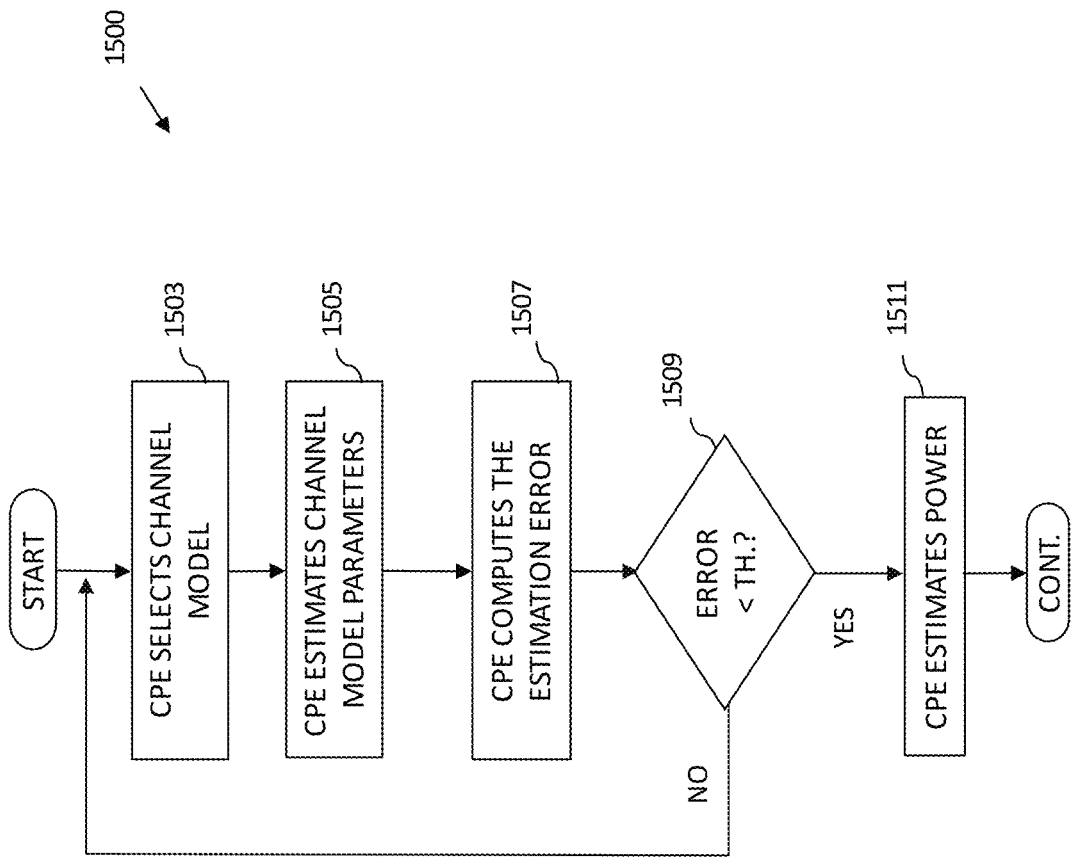
FIG. 15 is a logical flow diagram of one exemplary implementation of the method for path loss model selection of FIG. 14.

FIG. 15 illustrates one implementation of the general method 1400 (FIG. 14) for path loss model selection and parameter estimation according to the present disclosure.

Per step 1503 of the method 1500, the CPE/FWA selects a path loss model. As described previously, a multitude of path loss models for different propagation environments (e.g., urban, rural, downtown) may be made available to the CPE/FWA, whether indigenously via its own local storage, or by way of networked processes such as those of the MSO core 839.

Per step 1505, the CPE estimates the model parameters (e.g., exponent n, variance a) to use with its selected path loss model from its data base. In one variant, the model parameters are estimated using the curve fitting and estimation mechanisms known to those of ordinary skill in the RF engineering fields.

Per step 1507, the estimation error is computed (e.g., by the CPE/FWA), and if the estimation error is within a prescribed threshold value per step 1509, the CPE/FWA logic proceeds to step 1511, and estimates the sector power using the selected model (i.e., thereby indicating that the model was a good choice). If the estimation error is not within a threshold, the CPE/FWA proceeds to step 1503, selects a new model, and repeats the process.

Figure 16A:
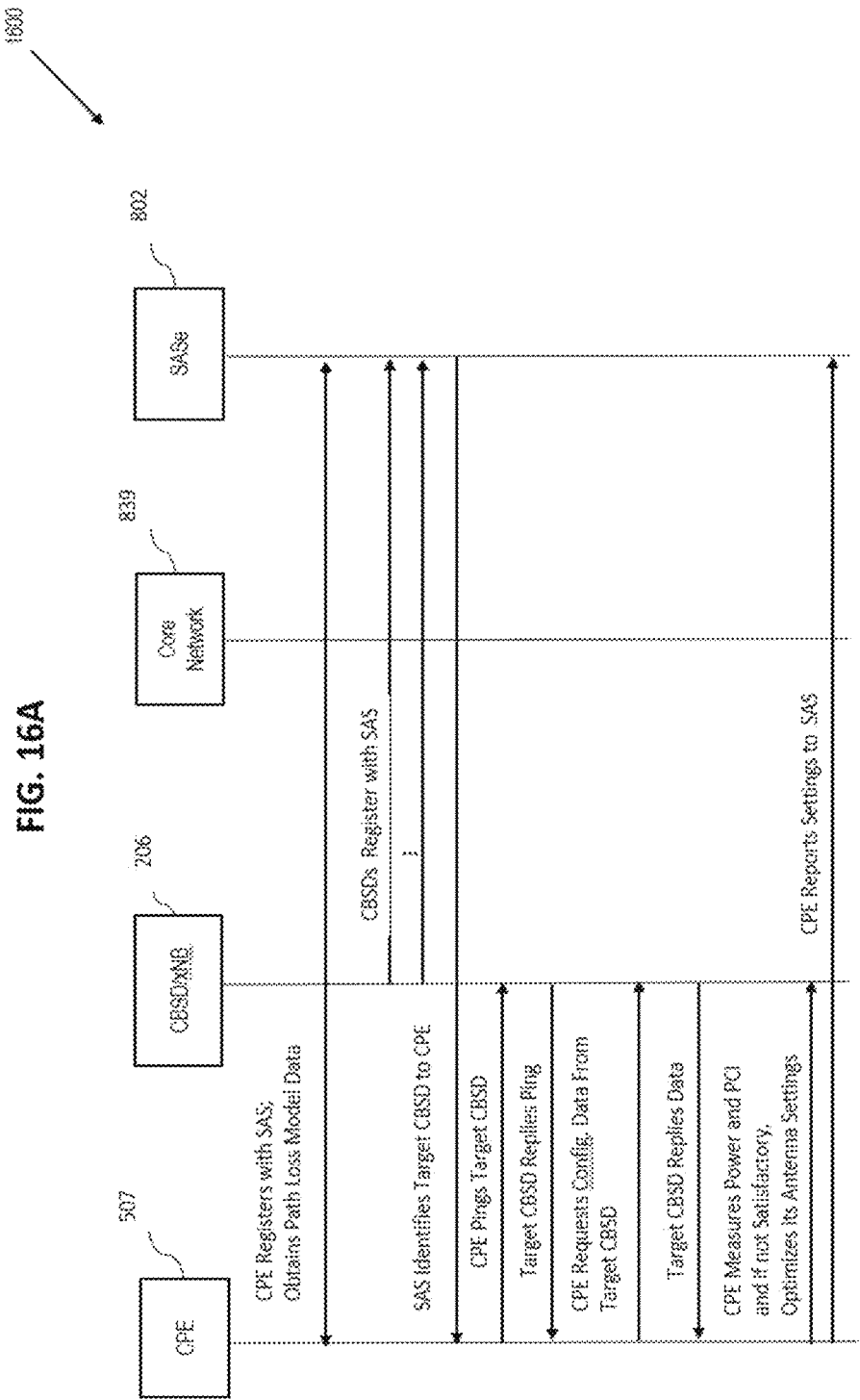
FIG. 16A is a ladder diagram illustrating a first exemplary communication flow between CPE/FWA, CBSD/xNB, Core Network and SAS entities during base station selection and antenna optimization, according the present disclosure.

FIG. 16A is a ladder diagram illustrating the communication flow between CPE, CBSD/xNB, core network 839, and SASes 802. As described above with respect to FIGS. 10-12B, this ladder diagram 1600 illustrates the case where the CPE/FWA and CBSDs each individually register with the enhanced SAS (SASe 802), and the SASe performs models selection and provision of "candidate" CBSD lists to the target CPE/FWA 507.

Figure 16B:
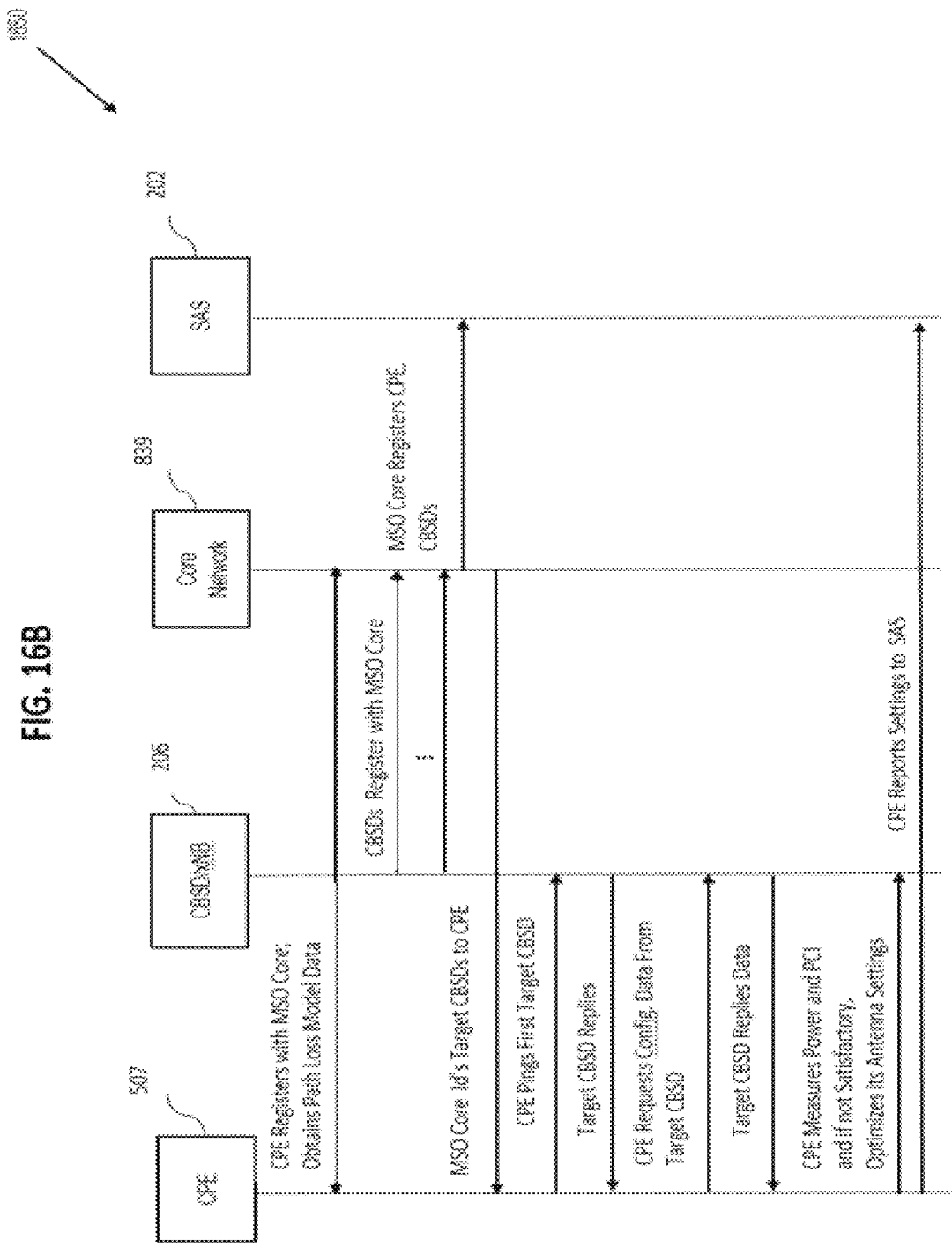
FIG. 16B is a ladder diagram illustrating another exemplary communication flow between CPE/FWA, CBSD/xNB, Core Network and SAS entities during base station selection and antenna optimization, according the present disclosure.

FIG. 16B is a ladder diagram illustrating the communication flow between CPE, CBSD/xNB, core network 839, and SAS 202 in an alternate configuration; i.e., one where a "commodity" or unenhanced SAS 202 is used, and one or more MSO network processes act as intermediary proxies between the SAS and the CBSDs and CPE/FWA devices 507. Specifically, this ladder diagram 1650 illustrates the case where the CPE/FWA and CBSDs each individually register with the MSO core process, and the core process both (i) causes registration and provision of data to the SAS 202 for registration, (ii) receives any germane data from the SAS on behalf of the CBSDs and CPE/FWA, and (iii) performs model selection and provision of the candidate CBSD lists to the target CPE/FWA 507. In that the MSO (owning both CPE/FWA and CBSDs in one ownership model) is uniquely positioned to obtain data on both the CBSDs and the individual CPE/FWA, including locations, installation orientation, antenna element heights, installation topologies, network topologies, etc., it is a natural choice for a proxy process, and such use also obviates having to modify or enhance existing SAS processes 202 with the expanded capabilities of the SASe 802 described herein.

It will also be recognized that the level of reporting made to the network regarding antenna and/or radio configurations and changes thereto may be (i) varied in scope, and (ii) made on either a final or intermittent basis, depending on which of the models 1600 or 1650 of communication is used. For example, a cognizant SAS or SASe may require certain data regarding the antenna configuration, such as transmit power, azimuth, elevation, etc. As such, the data set sent from the CPE/FWA 507 (or a network node further upstream, including for instance a 5G NR CU which is part of a CBSD) may be tailored so as to provide the SAS/SASe or the MSO core analytical or proxy process with the requisite data alone, or include supplementary data which may not be required but which may assist the SAS/SASe or MSOC core analytical or proxy process in further analysis of the operating environment of the particular CPE. For instance, the SAS/SASe or core process may utilize the collected received SINR data sent from the CPE/FWA 507 to determine which path loss model fits the propagation environment between the CBSD and the CPE, even though the CPE is in some embodiments tasked with such analytics.

It will be further appreciated that in addition the initial installation/post-installation configuration scenarios described above, the methods and apparatus described herein may also find significant utility in CBRS spectrum change or withdrawal scenarios. Specifically, as previously described, CBRS spectrum may be withdrawn by a SAS or SASe due to e.g., incipient incumbent usage. As such, wireless systems such as those described herein must be agile in adapting to the post-withdrawal operating environment, which may have marked differences from the pre-withdrawal environment. For example, if a given CBSD 206 has a spectrum grant of PAL spectrum which is being used by the CPE/FWA 507, and that spectrum is withdrawn and replaced with only GAA spectrum available via the same CBSD, signal quality and hence throughput to that CPE/FWA may decrease post-withdrawal (since GAA will typically be more congested in terms of users/interference by virtue of being completely unlicensed). Such degradation may be unacceptable to the CPE/user (e.g., may violate QoS or SLA requirements for that CPE), and as such the CPE/FWA 507 may utilize the techniques described herein to attempt to identify a better option (e.g., another "eligible" CBSD which may also have PAL spectrum available).

In another such scenario, the spectrum withdrawn (whether GAA or PAL) may be sufficiently different in frequency or other physical parameters such that channel characteristics or interference levels change, potentially degrading CPE performance due to e.g., reduced SINR at the CPE. The MCS of the CPE may need to be reduced, again taking the CPE below SLA or QoS requirements, thereby necessitating a search for a new CBSD.

As yet another scenario, the extant CBSD to which the CPE is connected may simply fail (e.g., radio or complete power failure) or be damaged, such as to due to natural forces such as wind storms, hurricanes, tornados, etc.

CPE/FWA Supplementation—

It will be appreciated that while the foregoing embodiments are described in terms of base stations (e.g., 3gPP-enabled CBSDs) as being the candidate devices which the CPE/FWA 507 evaluates, other types of devices may be included within the candidate pool. For instance, other CPE/FWA apparatus configured for supplementation or out-of-coverage service to the instant CPE/FWA 507 may be used to provide services, such as those described in co-pending U.S. patent application Ser. No. 16/738,889 filed Jan. 9, 2020 and entitled "METHODS AND APPARATUS FOR SERVICE PROVISION TO OUT-OF-COVERAGE APPARATUS IN WIRELESS SYSTEMS", as well as U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," each of the foregoing incorporated herein by reference in its entirety. For example, as described therein, wireless coverage for an exemplary unlicensed or quasi-licensed CPE/FWA that is at or beyond a coverage "edge" of a given network (or is otherwise experiencing less-than-adequate signal strength for whatever reason) may be provided service via "relay" and/or supplementation of services from a better-positioned "in coverage" CPE of the same network. As such, the radios and antenna elements (and decision logic) of the various embodiments of the present disclosure can be used to great advantage in such operational scenarios, such as to enable establishment of one or more wireless connections between respective ones of the sectorized radios and corresponding CBSDs within suitable range thereof, including pursuant to 3GPP "D2D" mechanisms.

Moreover, the CPE/FWA logic described herein may also be configured to utilize one or more signals indigenous within the underlying air interface protocols (e.g., 3GPP LTE/LTE-A or 5G NR in the exemplary configurations) to assess signal quality for a given antenna element or sector, such as CRS (cell-specific reference signal). As a brief aside, reference signals such as CRS in LTE support various functions, including channel estimation for MIMO decoding (demodulation), determination of PMI/CQI/RI feedback, and determination of multi-user resource allocation (scheduling). In a downlink (DL), the cell-specific reference signals (CRS) are transmitted by the xNB on unique resource elements for each antenna port, and are allocated in frequency and time. Since the CRS for each antenna port are mutually orthogonal to one another, channel estimation techniques such as interpolation can be used to determine estimates for the MIMO channel. This channel estimate can be used to derive PMI, CQI and RI feedback to determine the transmission scheme, and additional CQI reports may be requested from a given CPE/FWA by the xNB (CBSD) for the purpose of multi-user scheduling.

Hence, the mechanisms for assessing channel quality present within for example the underlying LTE (or 5G NR) protocols may be leveraged by the logic of the CPE/FWA 507 in gathering information for subsequent evaluation/analysis, whether by the CPE/FWA locally, by one or more network processes, or combinations thereof.

In addition, the exemplary CPE/FWA is configured in some embodiments to measure in one or more RF parameters (e.g., prior to achieving any connected state with a base station), such as RSSI, RSRP, RSRQ for each antenna element within a prescribed frequency range via its installed radios and associated RF front ends. As such, the CPE/FWA 507 can act somewhat as a spectrum analyzer to canvass the existing RF spectrum, such as during pre-provisioning, or even after installation/initial provisioning.

mmWave Embodiments—

Additionally, with advent of ever-higher frequencies being utilized within wireless standards such as 3GPP 5G NR Release 17 (which supports inter alia, mmWave frequencies on the order of 52.6-71 GHz), signal propagation and antenna direction (azimuth, tilt) become even more critical. While higher frequencies provide much enhanced data rates as compared to lower frequencies, they are also increasingly susceptible to propagation losses due to e.g., interposed objects such as buildings, billboards, trees/foliage, and even transitory objects such as humans or cars. Such mmWave systems generally require a clear LOS (line of sight) for optimal operation, and due to their relative "delicacy" in alignment and propagation issues, may require even more frequent intervention in order to maintain a suitable level of signal strength and throughput. While dynamic beam steering and so-called "massive MIMO" can account for some of these effects, actual realignment of an antenna array for a mmWave-based CPE or other such device may sometimes be needed.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for operating a fixed wireless device within a wireless network, the computerized method comprising:
   obtaining channel propagation model data from the wireless network, the channel propagation model data relating to at least one wireless channel between the fixed wireless device and at least two base stations;
   based at least on the channel propagation model data, computing an expected signal strength for each of the at least two base stations;
   measuring actual signal strength at the fixed wireless device from each of the at least two base stations;
   utilizing at least the expected signal strength and the actual signal strength associated with each of the at least two base stations to determine a respective difference value for each of the at least two base stations;
   selecting one of the at least two base stations as a basis for optimizing a configuration of at least one antenna of the fixed wireless device; and
   invoking an antenna azimuth adjustment process based on the difference value of the selected one of the at least two base stations meeting or exceeding a prescribed value, the measured actual signal strength being less than the expected signal strength.

2. The computerized method of claim 1, wherein:
   the fixed wireless device comprises a CBRS (Citizens Broadband Radio Service) compliant FWA (fixed wireless access) device;
   the at least two base stations comprise at least one Citizens Broadband Radio Service Device (CBSD); and
   the obtaining the channel propagation model data comprises obtaining model data relating to a frequency band between 3.550 and 3.700 Ghz.

3. The computerized method of claim 1, wherein the obtaining the channel propagation model data from the wireless network comprises obtaining the channel propagation model data from a SAS (spectrum allocation system) of a CBRS network.

4. The computerized method of claim 1, further comprising obtaining sector-specific data from the at least two base stations;
   wherein at least the computing of the expected signal strength, and the measuring the actual signal strength at the fixed wireless device, comprise computing and measuring on a per-sector basis, respectively, based on the obtained sector-specific data.

5. The computerized method of claim 4, wherein the obtaining the sector-specific data from the at least two base stations comprises obtaining at least a PCI (physical cell identifier) and transmit power for each of a plurality of sectors of the at least two base stations.

6. The computerized method of claim 1, wherein the computing of the expected signal strength for each of the at least two base stations comprises utilizing the channel propagation model data to predict a power level for each of the at least two base stations.

7. A computerized premises apparatus for use in a wireless infrastructure, the computerized premises apparatus comprising:
   digital processing apparatus;
   an antenna system comprising at least one antenna element and at least one actuation apparatus configured to change at least one aspect of operation of the at least one antenna element;
   radio modem apparatus in signal communication with the antenna system;
   controller apparatus in data communication with the antenna system and the digital processing apparatus and configured to control the at least one actuation apparatus; and
   a storage device in data communication with the digital processing apparatus, the storage device comprising a storage medium having at least one computer program, the at least one computer program configured to, when executed on the digital processing apparatus, cause the computerized premises apparatus to:
   determine a first actual signal strength based at least on radio frequency signals received by the antenna system, the radio frequency signals originating from a first base station;

determine a second actual signal strength based at least on second radio frequency signals received by the antenna system, the second radio frequency signals received from a second base station;

determine a first expected signal strength associated with the first base station based at least on channel propagation model data;

determine a second expected signal strength associated with the second base station based at least on the channel propagation model data; and utilize at least (i) the first and the second actual signal strengths, and (ii) the first and the second expected signal strengths to optimize the configuration of the at least one antenna element via use of the at least one actuation apparatus, the utilization of the at least (i) the first and the second actual signal strengths, and (ii) the first and the second expected signal strengths to optimize the configuration of the at least one antenna element comprising:

a determination whether to invoke an antenna azimuth adjustment process based on at least one of:
(i) a difference between the first actual signal strength and the first expected signal strength, or
(ii) a difference between the second actual signal strength and the second expected signal strength; and invocation of the antenna azimuth adjustment process based on at least one of the differences meeting or exceeding a prescribed value;

wherein at least the determinations of the second actual signal strength and the second expected signal strength are performed in a prescribed order sequentially with the determinations of the first actual signal strength and the first expected signal strength, the prescribed order based at least in part on respective distances between the computerized premises apparatus and each of the first base station and the second base station.

8. The computerized premises apparatus of claim 7, wherein the first actual signal strength is less than the first expected signal strength.

9. The computerized premises apparatus of claim 7, wherein:
the computerized premises apparatus comprises a CBRS (Citizens Broadband Radio Service) compliant FWA (fixed wireless access) device;
the first base station and the second base station each comprise a Citizens Broadband Radio Service Device (CBSD); and
the channel propagation model data comprises model data relating to a frequency band between 3.550 and 3.700 Ghz.

10. The computerized premises apparatus of claim 7, wherein the utilization of at least (i) the first and the second actual signal strengths, and (ii) the first and the second expected signal strengths to optimize the configuration of the at least one antenna element via the use of the at least one actuation apparatus comprises at least:
determination of the difference between the first actual signal strength and the first expected signal strength; and
based at least on the difference, utilization of the controller apparatus to implement a protocol using the at least one actuation apparatus, the protocol comprising a plurality of adjustments of a position of the at least one antenna element in order to provide a desired level of performance for at least one communication channel between the computerized premises apparatus and the first base station.

11. The computerized premises apparatus of claim 10, wherein the at least one computer program is further configured to, when executed on the digital processing apparatus, cause the computerized premises apparatus to:
determine a second difference between the second actual signal strength and the second expected signal strength for the second base station; and
based at least in part on the difference and the second difference, select one of the first base station and the second base station as a basis for the utilization of the controller apparatus.

12. The computerized premises apparatus of claim 7, wherein:
the at least one computer program is further configured to, when executed on the digital processing apparatus, cause the computerized premises apparatus to:
obtain sector-specific data from at least the first base station, the sector-specific data comprising at least a PCI (physical cell identifier) and transmit power for each of a plurality of sectors of the first and second base stations, respectively; and
at least the determinations of the first and the second expected signal strengths, and the determinations of the first and the second actual signal strengths, comprise computation and measurement on a per-sector basis, respectively, based on the obtained sector-specific data.

13. The computerized premises apparatus of claim 7, wherein:
the determination of the first expected signal strength associated with the first base station based at least on the channel propagation model data comprises utilization of the channel propagation model data to predict a power or signal level associated with the first base station; and
the determination of the second expected signal strength associated with the second base station based at least on the channel propagation model data comprises utilization of the channel propagation model data to predict a power or signal level associated with the second base station.

14. Computer readable apparatus comprising a non-transitory storage medium, the non-transitory storage medium comprising at least one computer program having a plurality of instructions, the plurality of instructions configured to, when executed on a processing apparatus, cause a computerized premises device to:
obtain channel propagation model data, the channel propagation model data relating to at least one wireless channel between the computerized premises device and at least two base stations;
based on the channel propagation model data, compute an expected signal strength for each of the at least two base stations;
measure, at the computerized premises device, actual signal strength associated with each of the at least two base stations;
utilize at least the expected signal strength and the actual signal strength associated with each of the at least two base stations to determine a respective difference value for each of the at least two base stations;
select one of the at least two base stations as a basis for optimizing a configuration of at least one antenna of the computerized premises device;

determine whether to invoke an antenna azimuth adjustment process based at least on the difference value of the selected one of the at least two base stations; and cause invocation of the antenna azimuth adjustment process based on the difference value of the selected one of the at least two base stations meeting or exceeding a prescribed value.

15. The computer readable apparatus of claim 14, wherein:
the computerized premises device comprises a CBRS (Citizens Broadband Radio Service) compliant FWA device;
the at least two base stations comprises at least one Citizens Broadband Radio Service Device (CBSD); and
the obtainment the channel propagation model data comprises obtaining model data relating to a frequency band between 3.550 and 3.700 Ghz inclusive.

16. The computer readable apparatus of claim 15, wherein the obtainment of the channel propagation model data comprises obtaining the channel propagation model data from a SAS (spectrum allocation system) of a CBRS network.

17. The computer readable apparatus of claim 14, wherein:
the plurality of instructions are configured to, when executed on the processing apparatus, cause the computerized premises device to:
obtain sector-specific data from the at least two base stations; and
the computation of the expected signal strength and the measurement of the actual signal strength at the computerized premises device are on a per-sector basis, respectively, based on the obtained sector-specific data.

18. The computer readable apparatus of claim 17, wherein the obtainment of the sector-specific data from the at least two base stations comprises obtainment of at least a PCI (physical cell identifier) and transmit power for each of a plurality of sectors of the at least two base stations, respectively.

19. The computer readable apparatus of claim 14, wherein the expected signal strength comprises an estimated or predicted signal strength.

20. Computer readable apparatus comprising a non-transitory storage medium, the non-transitory storage medium comprising at least one computer program having a plurality of instructions, the plurality of instructions configured to, when executed on a processing apparatus, cause a computerized premises apparatus within a wireless infrastructure to:
receive parametric data from a spectrum allocation entity;
obtain propagation model data from local storage apparatus of the computerized premises apparatus;
update the propagation model data with the parametric data;
generate first data relating to an expected signal strength based on the updated propagation model data, the expected signal strength relating to at least one wireless channel between the computerized premises apparatus and at least one wireless access node;
receive second data relating to an actual signal strength at the computerized premises apparatus for the at least one wireless channel;
utilize at least the first data and the second data to optimize a configuration of at least one antenna of the computerized premises apparatus, the utilization of the first data and the second data to optimize the configuration of the at least one antenna of the computerized premises apparatus comprising a determination whether to invoke an antenna azimuth adjustment process based at least on a difference between the expected signal strength and the actual signal strength; and
cause invocation of the antenna azimuth adjustment process based on the difference meeting or exceeding a prescribed value.

21. The computer readable apparatus of claim 20, wherein the propagation model data comprises data representative of a plurality of parameters selected by a computerized network apparatus for use with at least one propagation model.

22. The computer readable apparatus of claim 21, wherein:
the wireless infrastructure comprises a wireless network utilizing 3GPP (Third Generation Partnership Project) 4G (fourth Generation) Long Term Evolution or 5G (Fifth Generation) New Radio compliant infrastructure utilizing Citizens Broadband Radio Service (CBRS) spectrum within a frequency range of 3.55 to 3.70 GHz; and
the computerized network apparatus comprises a CBRS SAS (spectrum allocation system).

23. The computer readable apparatus of claim 21, wherein:
the wireless infrastructure comprises a wireless network utilizing 3GPP (Third Generation Partnership Project) 4G (fourth Generation) Long Term Evolution or 5G (Fifth Generation) New Radio compliant infrastructure utilizing Citizens Broadband Radio Service (CBRS) spectrum within a frequency range of 3.55 to 3.70 GHz;
the computerized network apparatus comprises a computerized process operated by a multiple systems operator (MSO) of a managed content delivery network; and
the computerized premises apparatus and the at least one wireless access node are each managed by the MSO.

* * * * *